United States Patent
Baugh et al.

(10) Patent No.: US 10,936,092 B1
(45) Date of Patent: Mar. 2, 2021

(54) FORCE-SENSING STRUCTURES FOR AN ELECTRONIC DEVICE

(71) Applicant: Apple Inc., Cupertino, CA (US)

(72) Inventors: Brenton A. Baugh, Los Altos Hills, CA (US); Wingshan Wong, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 22 days.

(21) Appl. No.: 15/879,346

(22) Filed: Jan. 24, 2018

Related U.S. Application Data

(60) Provisional application No. 62/464,836, filed on Feb. 28, 2017.

(51) Int. Cl.
   *G06F 3/0354* (2013.01)
   *G06F 3/038* (2013.01)
   *G06F 3/0346* (2013.01)

(52) U.S. Cl.
   CPC ........ *G06F 3/03545* (2013.01); *G06F 3/0346* (2013.01); *G06F 3/0383* (2013.01)

(58) Field of Classification Search
   CPC .... G06F 3/03545; G06F 3/044; G06F 3/0414; G06F 2203/04105; G06F 3/0383; G06F 3/0346
   See application file for complete search history.

(56) References Cited

U.S. PATENT DOCUMENTS

| | | | |
|---|---|---|---|
| 4,883,926 A | 11/1989 | Baldwin | |
| 5,414,227 A | 5/1995 | Schubert et al. | |
| 5,981,883 A | 11/1999 | Shriver et al. | |
| 7,202,862 B1* | 4/2007 | Palay | G06F 3/03545 178/18.01 |
| 8,878,824 B2 | 11/2014 | Besperstov | |
| 9,176,604 B2 | 11/2015 | Krah et al. | |
| 9,483,127 B2 | 11/2016 | Obata | |
| 9,582,093 B2* | 2/2017 | Vandermeijden | G06F 3/041 |
| 10,048,778 B2* | 8/2018 | Mishalov | G06F 3/033 |
| 2004/0234322 A1* | 11/2004 | Candelora | B29C 45/14426 401/103 |
| 2005/0156912 A1 | 7/2005 | Taylor et al. | |
| 2008/0128180 A1 | 6/2008 | Perski et al. | |
| 2008/0257613 A1* | 10/2008 | Katsurahira | G06F 3/03545 178/19.04 |
| 2008/0309645 A1 | 12/2008 | Wang | |

(Continued)

FOREIGN PATENT DOCUMENTS

EP  0182144  5/1986

*Primary Examiner* — Kent W Chang
(74) *Attorney, Agent, or Firm* — Morgan, Lewis & Bockius LLP

(57) ABSTRACT

Embodiments are directed to a force sensor used within an electronic device, such as a stylus, watch, laptop, or other electronic device. A force sensor may be positioned, for example, within a stylus body. The force sensor may include an input structure constrained within a housing by a compliant member. The input structure may extend at least partially out of the stylus body and be configured to receive a force input. One or more sensors of the force sensor may detect a value of a displacement of the input structure caused by the force input. A processing unit may determine a value of the force input using a spring characteristic of the compliant member and the detected value of displacement.

19 Claims, 20 Drawing Sheets

(56) References Cited

U.S. PATENT DOCUMENTS

| | | | |
|---|---|---|---|
| 2015/0070330 A1* | 3/2015 | Stern | G06F 3/03545 |
| | | | 345/179 |
| 2016/0188013 A1 | 6/2016 | Yoneoka et al. | |
| 2016/0188086 A1* | 6/2016 | Yairi | G06F 3/016 |
| | | | 345/174 |
| 2017/0068339 A1 | 3/2017 | Zimmerman et al. | |
| 2017/0068340 A1 | 3/2017 | Zimmerman et al. | |
| 2017/0068341 A1 | 3/2017 | Zimmerman et al. | |
| 2017/0068342 A1 | 3/2017 | Zimmerman et al. | |

\* cited by examiner

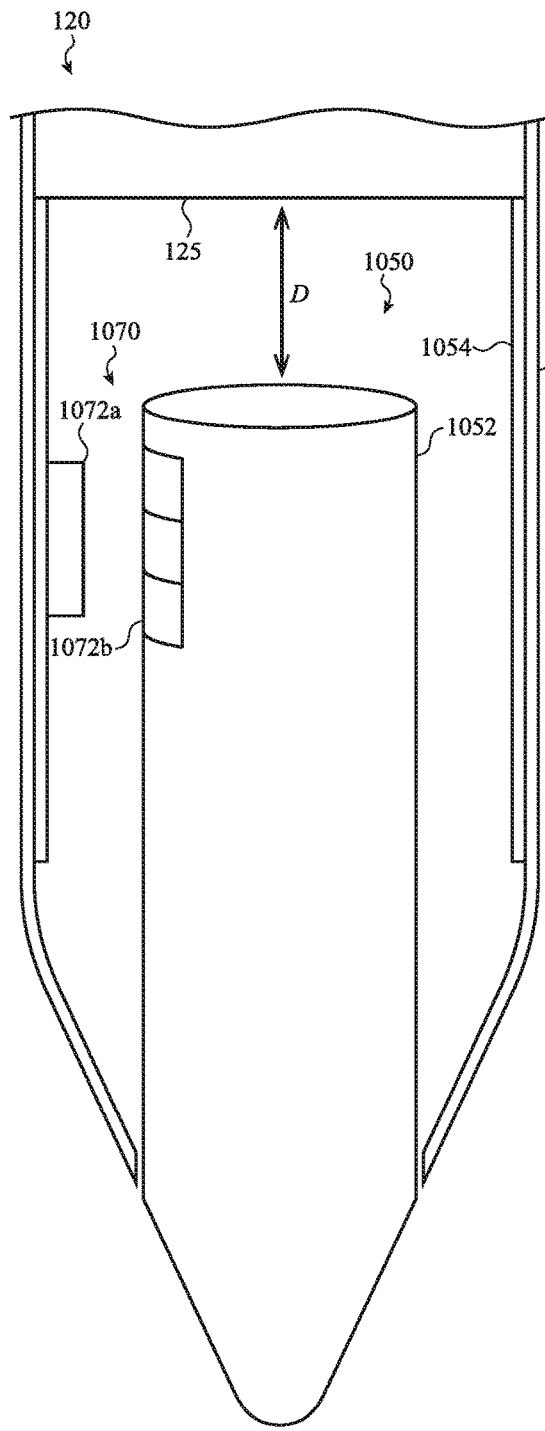
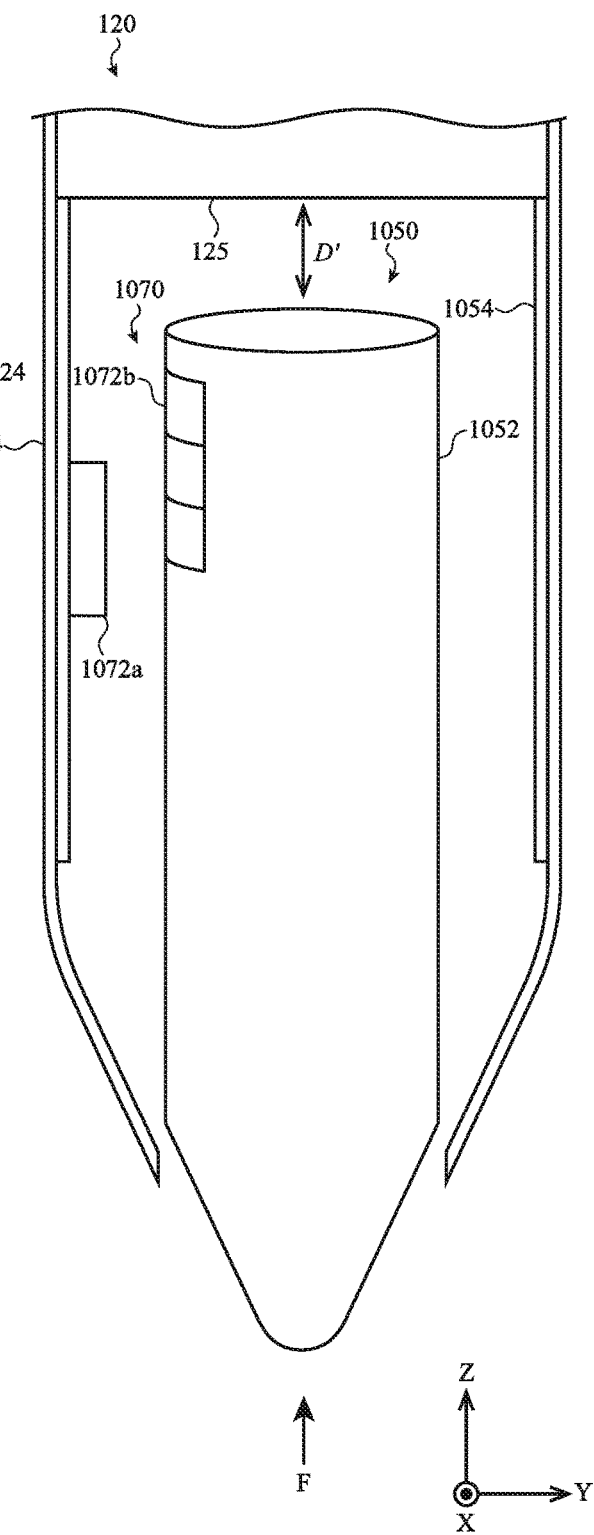
*FIG. 10A*  *FIG. 10B*

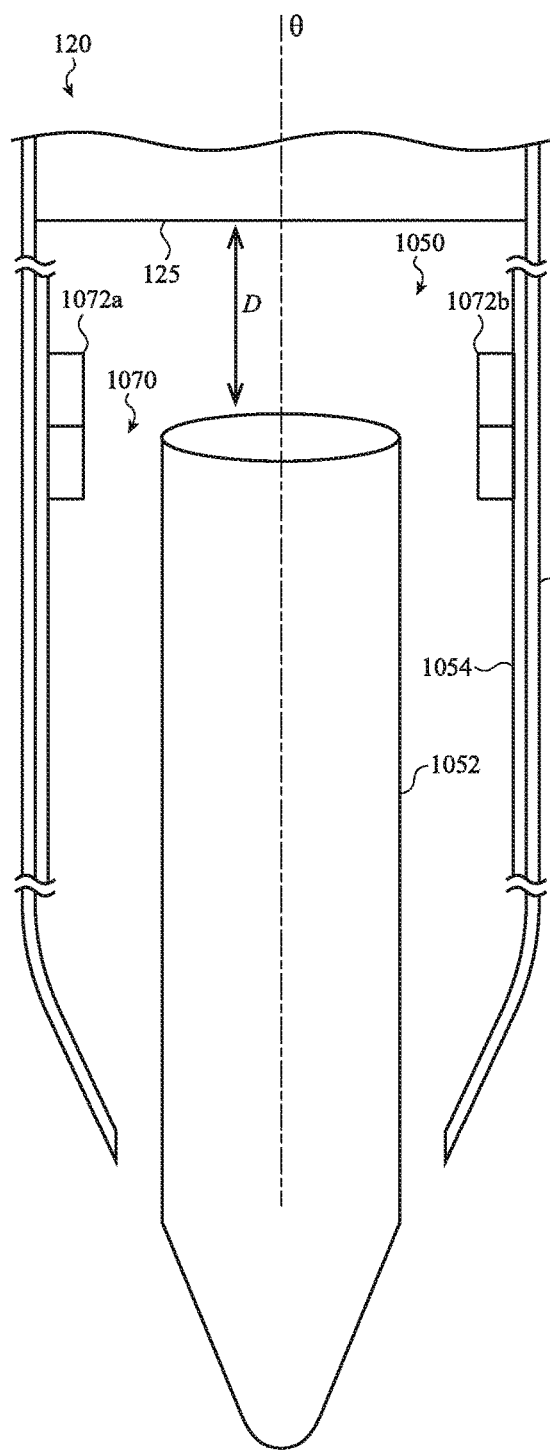 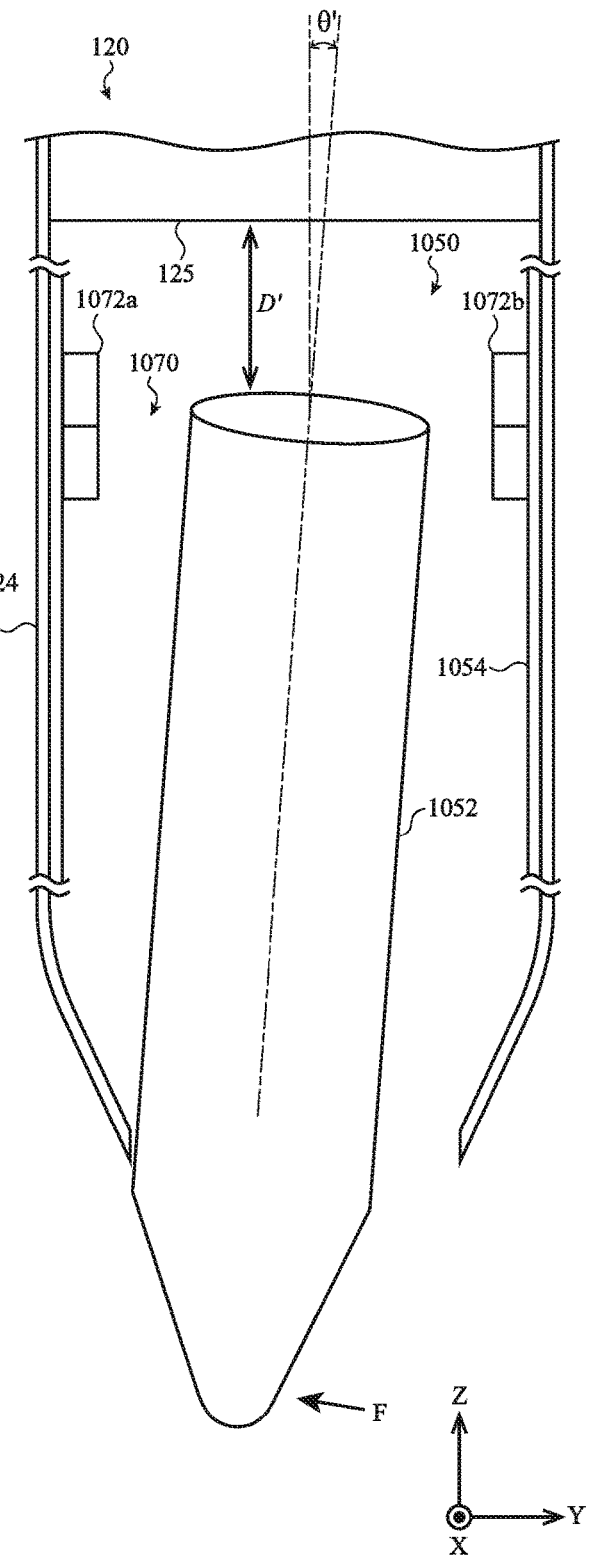
*FIG. 12A*  *FIG. 12B*

FORCE-SENSING STRUCTURES FOR AN ELECTRONIC DEVICE

CROSS-REFERENCE TO RELATED APPLICATIONS

This application claims the benefit under 35 U.S.C. § 119(e) of U.S. Provisional Patent Application No. 62/464,836, filed on Feb. 28, 2017 and titled "Force-Sensing Structures For An Input Device," which is incorporated by reference as if fully disclosed herein.

FIELD

The described embodiments relate generally to force sensors for an input device. More specifically, the present disclosure is directed to estimating a force input based on movement of an input structure.

BACKGROUND

In computing systems, a force sensor may be employed to receive input from a user. Many traditional force sensors use a strain gauge to measure force based on a strain within a metal beam or bracket resulting from a force input, which may limit the accuracy and precision of the sensor. Non-symmetries in the metal beam, manufacturing tolerances, and/or off-axis deformations may impermissibly affect force measurements using such sensors, thereby limiting the functionality of the sensor to control an interconnected electronic device.

SUMMARY

One embodiment takes the form of an input device, comprising: an enclosure defining an interior volume; a force sensor at least partially positioned within the interior volume and comprising: a housing coupled to the enclosure; an input structure extending through the housing and out of the enclosure, the input structure configured to receive a force input; a compliant member coupled to the housing and the input structure; and a sensor positioned within the housing and configured to detect a value of a displacement of the input structure caused by the force input.

Another embodiment takes the form of an input device, comprising: a force sensor, comprising: a housing; an input structure at least partially surrounded by the housing and configured to receive a force input; a compliant member encircling the input structure within the housing and configured to deform in response to the force input, thereby controlling a movement of the input structure relative to the housing; and a sensor configured to detect the movement of the input structure; and a processing unit configured to determine a value of the force input from the movement of the input structure.

Yet another embodiment takes the form of an input device, comprising: an enclosure defining an exterior surface; an input structure at least partially extending into the enclosure and configured to move axially and tilt relative to the enclosure in response to a force input; a compliant member connected to the input structure and configured to deform in response to the force input; and a sensor configured to detect both axial movement and tilt of the input structure, wherein: the input device is configured to transmit a signal to another electronic device that is derived from a value of at least one of the axial movement or the tilt and an estimated deformation of the compliant member.

In addition to the example aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like elements.

FIG. 10A depicts a simplified cutaway view of a sensor configuration of the stylus of FIG. 4 in a first position, taken along line A-A of FIG. 4;

FIG. 10B depicts a simplified cutaway view of the sensor configuration of FIG. 10A in a second position, taken along line A-A of FIG. 4;

FIG. 12A depicts a simplified cutaway view of another sensor configuration of the stylus of FIG. 4 in a first position, taken along line A-A of FIG. 4;

FIG. 12B depicts a simplified cutaway view of the sensor configuration of FIG. 12A in a second position, taken along line A-A of FIG. 4;

Figure 1:
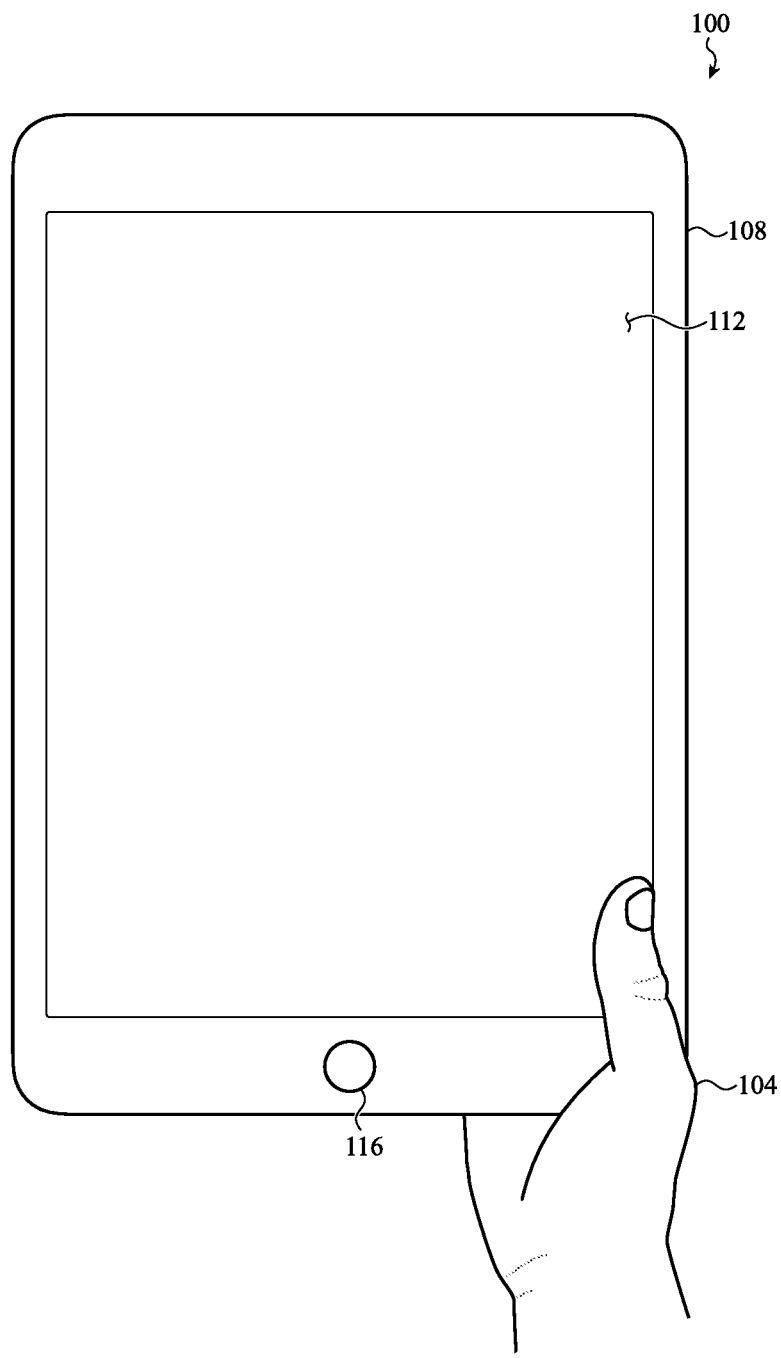
FIG. 1 depicts a sample electronic device held by a user.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

The description that follows includes sample systems, methods, and apparatuses that embody various elements of the present disclosure. However, it should be understood that the described disclosure may be practiced in a variety of forms in addition to those described herein.

The present disclosure describes systems, devices, and techniques related to force sensors for an input device. A force sensor may be used with any appropriate input device that is configured to receive user input, including, but not limited to, portable computing devices, wearable devices, phones, or the like. The force sensor may form, or be a component of, an input structure of the input device, such as a stylus, keyboard, trackpad, touch screen, three-dimensional input systems (e.g., virtual or augmented reality input systems), or other corresponding input structure. The force sensor may be used to detect a force input of an associated input structure, including detecting a value such as duration, magnitude, and/or direction, of the force input. A processing unit of the electronic device may use the detected force input to control a function of the electronic device.

In one embodiment, the force sensor is configured to detect a force input by measuring a displacement of one or more components/input structures of the force sensor. For example, the force sensor may include a mass, driver, or other appropriate input structure configured to receive a force input from a user. The input structure may be at least partially positioned within an opening of a sleeve, shaft, casing, or other housing structure of the electronic device. A deformable component, including a compliant member, tuning member, or other elastic structure may separate and be coupled with the input structure and the housing within the opening. This may control the input structure's movement relative to the housing in response to the force input.

The compliant member may contact, abut, or otherwise couple with both the input structure and the housing. For example, the compliant member may be received by or engaged along a surface of the input structure and sidewalls of the housing within the opening. As such, the housing may constrain an outer portion of the compliant member, while the input structure constrains an inner portion of the compliant member. The compliant member may deform (e.g., locally elongate, compress, or the like) between the housing and the input structure as the input structure moves within the opening of the housing in response to the force input. As such, the force required to move the input structure may be at least partially dependent on (or vary with) the force required to deform the compliant member over a range of distances. In this regard, the compliant member may be used within the force sensor to at least partially control or impede movement of the input structure, such as axial movement along a longitudinal axis of the housing. Movement of the input structure may thus be indicative of a force input exerted on the input structure (e.g., including a duration, magnitude and/or direction of the force input, due to the engagement of the input structure with the compliant member).

The force sensor may therefore measure movement of the input structure to detect, estimate, correlate or otherwise determine the force input exerted on the input structure, and analyze the characteristics related thereto. For example, the force sensor may include, or be integrated or coupled with, a sensor configured to measure displacement. The sensor may be a displacement sensor that measures axial movement (axial translation) and/or rotational movement of the input structure. The displacement sensor may also be configured to measure off-axis translation of the input structure (e.g., a tilt or angular offset of the input structure produced by an off-axis force), according to the embodiments described herein.

A processing unit (which may take the form of, or include, control logic circuitry) integrated within, or coupled to, the force sensor may estimate the force input received at the input structure using the detected motion or displacement of the input structure and a characteristic of the compliant member. For example, the compliant member may operate according to a spring characteristic, which may control the amount the compliant member generally deforms in response to a force input (e.g., due to physical characteristics of the compliant member). The spring characteristic may correspond generally to the spring constant "k" as represented in the Hooke's law equation: $F=kx$. The relationship between the displacement of the complaint member and the force input may thus be represented by a force-displacement curve, which depicts a force required to displace or deform the complaint member by a set amount. As described herein, the input structure may be constrained within the opening of the housing by the compliant member. As such, the compliant member may deform in response to movements (including axial movement, tilt, rotational movements, and so on) of the input structure, and thus the movements of the input structure may be measured to estimate a state of deformation of the compliant member. As the state of deformation of the compliant member is indicative of a predefined or expected force exerted on the compliant member, movements of the input structure may be used to determine forces acting on the compliant member. In turn, the force required to deform the compliant member may correspond to the force required to move the input structure over a range of predefined distances (e.g., due to the input structure being partially constrained by the input structure). Accordingly, the force sensor may use the estimate force acting on the compliant member to estimate forces acting on the input structure, for example, including a value such as a magnitude, duration, and/or direction, of a force input acting on the input structure, as described herein.

As described in greater detail below, the compliant member may be a tunable member that is constructed based on various material and geometric parameters. These parameters may allow the compliant member to exhibit certain predetermined properties or characteristics, including any or all of stiffness, elasticity, durability, and/or other similar or related properties. Accordingly, the spring characteristic of the compliant member may be determined by the construction of the compliant member. For example, the spring characteristic may be based on, at least in part, a characteristic of the compliant member, including: a width of the compliant member, a shape of the compliant member, a material of the compliant member, or a position of the compliant member along the input structure. The processing unit may thus have the particular characteristics of the compliant member to determine the force input exerted on the input structure.

To illustrate, the physical characteristics of the compliant member may influence or otherwise control a value (e.g., magnitude, duration, and/or direction) of movement of the input structure caused by the force input. For example, the magnitude and/or direction of the movement of the input structure may be proportional (or otherwise correlated or dependent upon) one or more of the physical characteristics of the compliant member. Such a relationship may be due to the constraint or engagement of the compliant member along the input structure and the housing, at least in some embodiments. Accordingly, the processing unit may determine a value (e.g., magnitude, duration, and/or direction) of a force input and by reference to a predefined force-displacement behavior of the input structure as determined or controlled by the compliant member. In turn, the processing unit may use the determined value (such as magnitude, direction, and/or duration) and/or other characteristic of the force input to control a function of an electronic device, as described herein.

The foregoing force sensor, force-sensitive assembly, or the like may be used in a variety of applications. As one example embodiment, the force sensor may be a component of a stylus (e.g., a marking tool, smart pen, smart brush, and/or other hand-held input device). The stylus may be used to control or manipulate an interconnected electronic device, such as a portable computing device or tablet. For example, a user may manipulate the stylus relative to an input surface of the interconnected electronic device to convey information to the electronic device, such as, but not limited to, writing, sketching, scrolling, gaming, selecting user interface elements, moving user interface elements, and so on. The force exerted by the stylus on the input surface of the electronic device may augment or provide additional information to the electronic device. As one example, when used for writing, a width of a line generated on the input surface may be dependent on the force exerted by the stylus. A graphical output of the input structure of the interconnected electronic device may therefore be manipulated in response to one or both of the determined magnitude or determined direction of the force input, both of which (together or separately) are example values of the force input.

In this regard, the force sensor, force-sensitive assembly, or the like described herein may be used within the stylus to detect one or more characteristics of a force exerted by the stylus on the input surface. For example, the input structure described herein may be a mass, driver, or tip at least partially extending from an enclosure that defines a body of the stylus. The enclosure may define, or be coupled with, a housing that surrounds a portion of the input structure. In operation, a user may press the input structure against the input surface of the electronic device, thereby generating a force input that causes the input structure to move relative to the body.

As described above, a compliant member may be positioned between the mass and the enclosure and configured to control the movement of the input structure caused by the force input. In a particular embodiment, the compliant member may be a set of O-rings encircling the input structure. The set of O-rings (or other elastic structure) may be silicone or other elastically deformable material. Each may be coupled to or engaged with the input structure and a housing positioned within an interior volume defined by the enclosure. A groove, notch, cut, or other engagement feature may be formed into one or both of the housing and/or the input structure and may receive a corresponding one of the set of O-rings. This may constrain an inner diameter of an O-ring at the input structure and an outer diameter of the O-ring at the housing. As such, movement of the input structure due to the force input may deform the O-rings between the housing and the input structure, and thereby control a range of motion exhibited by the input structure in response to a force input. For example, one or more mechanical or material properties of the O-rings may determine a magnitude of force required to deform the O-rings, which in turn, due to the constrained boundaries of the O-rings, may determine an amount of force required to displace the input structure over a range of distances.

The set of O-rings may be arranged along the mass in a variety of manners in order to control one or more characteristics of movement of the input structure resulting from the force input. For example, the set of O-rings may be a pair of two O-rings spaced apart on the input structure according to a predetermined separation distance. The axial and/or radial stiffness of the input structure may at least partially depend on the magnitude of the predetermined separation distance. Accordingly, the pair of O-rings may be positioned closer to, or further apart from, one another in order to control an axial and/or radial stiffness of the mass. In other cases, the set of O-rings may include three, four, or more O-rings arranged in various positions along the input structure, including configurations in which some of the set of O-rings abut one another, while others of the set of O-rings are spaced apart from the abutting O-rings, as may be appropriate for a given application.

It will be appreciated that various other compliant members, including compliant members of various materials, shapes, and/or sizes, may be used with the present invention, as described herein. For example, the compliant member may be a deformable or elastic structure, such as a cylinder or sleeve, encompassing a portion of the mass that is positioned within the stylus body. The deformable elastic structure may be a silicone insert that is molded or formed into a gap between the mass and the housing, for example, such as via an overmolding process. As such, substantially analogous to the set of O-rings, the deformable elastic structure may be constrained by the housing and the input structure (e.g., due to engagement with respective surfaces of each) and control movement of the mass resulting from the force input. In other cases, the compliant member may include one or both of the O-rings and the insert molded silicone elastic structure, as described herein. For example, a pair of O-rings may be positioned around, and spaced apart on, the mass, and the insert molded silicone elastic structure may be formed around the mass between the spaced apart O-rings.

The stylus may include various sensors that are configured to measure movement of the mass. The sensor may be any appropriate sensor that can measure one or more of axial translation, rotation, and/or off-axis translation or tilt of the mass, including a magnetic or Hall Effect sensor, a capacitive-based sensor, an optical sensor, or the like. In this regard, broadly, the sensor may be configured to measure a magnitude of a displacement of the input structure as the input structure moves relative to the stylus body. This may be accomplished in a variety of manners based on the displacement sensor used. As one illustration, the displacement sensor may be a capacitive-based sensor that measures a change in capacitance between two electrodes to determine a displacement or separation between the electrodes; the set of electrodes is one example of a sensor. As such, each of the stylus body and the mass may have one of such electrodes, and the sensor may determine a displacement of the mass as the capacitance between the electrodes varies based on movements of the mass. Additionally or alternatively, each of the electrodes may be positioned on opposing internal surfaces of the body (e.g., positioned on either side of the input structure) and the sensor may determine displacement of the mass as the capacitance between the electrodes varies based on movement of the mass (e.g., the mass may alter a dielectric characteristic between the electrodes as the mass moves).

In other embodiments, different sensors and techniques are contemplated and described in greater detail below. As one example, the sensor may be an optical sensor or encoder. The input structure may be coupled with, or define, various trackable elements (e.g., indicia, grooves, and so on) and the stylus may include an optical reader that measures the radial displacement or rotation of the mass using the trackable elements. The compliant member may also constrain or otherwise control radial displacement of the input structure. In this regard, the measured radial displacement may be used to measure a force input associated with the radial displacement of the mass according to the techniques described herein.

In some cases, the sensor may measure a magnitude of a displacement of multiple discrete portions of the mass as the mass moves relative to the stylus body. This may allow the force sensor to determine an orientation or direction of the force input (e.g., including estimating a magnitude of off-axis force received at the input structure). For example, an off-axis force received at the input structure may cause a distinct or different displacement at each of the multiple discrete portions of the input structure, because the off-axis force may tilt or angularly displace the input structure within the stylus body. By measuring the displacement at three or more of such portions, a processing element coupled with the stylus may approximate a force vector received at the input structure that causes the resulting tilt or angular displacement of the input structure. In other configurations, other sensors are contemplated to measure the tilt or off-axis force received at the input structure. The tilt of the input structure may be used to provide additional input to an electronic device using the stylus.

In other embodiments, the force sensor, force-sensitive assembly, or the like may be used as a component of a wearable electronic device, such as a watch. As one example, the input structure of the force sensor described herein may be defined by a crown connected with a mass or coupling extending into a watch body. A compliant member or other elastically deformable component may be positioned between the input structure and the watch body and configured to control or impede movement of the crown resulting from a user input. In this manner, a processing unit of the watch, analogous to that described above, may determine various characteristics of the force input using a detected displacement of the mass and various predetermined characteristics (e.g., such as elasticity) of the tuning member.

Accordingly, the input structure may be used to receive rotational and translational input from a user to control a function of the watch. The input structure extending into the watch body may be translatable and/or rotatable according to a or spring characteristic of the compliant members engaged with, and positioned between, the input structure and watch body. This may allow a processing unit (or other processing element) of the watch to detect, estimate, or otherwise determine a force associated with, or responsible for, a translational and/or rotational movement of the input structure. In turn, the processing unit may control a function of the watch based on an estimated value, such as magnitude, direction, duration, and/or type (e.g., translation or rotational) of the force input. For example, the processing unit may alter a display of the watch in a first manner based on detecting a predetermined value of a force input causing translational movement of the input structure and alter the display in a second manner based on determining a predetermined magnitude of a force input causing rotational movement of the input structure.

In another embodiment, the force sensor, force-sensitive assembly, or the like may be used as an input structure (for example, a button, key, switch, or the like) of an electronic device. The input structure of an electronic device may be configured to control an electronic device at least in part on a force input received from a user. In this regard, the input structure of the force sensor described above may be a key cap or other input surface. Such a key cap may be positioned above a substantially rigid substrate or housing. A compliant member may be positioned between the key cap and the housing, and configured to deform in response to a force input received at the key cap. In one embodiment, the compliant member may couple with the key cap around an outer periphery of the key cap and define a through portion.

In this regard, the compliant member may control or impede displacement of the key cap caused by the force input. A processing unit of the electronic device, analogous to that described above, may therefore measure a characteristic of the received force input (e.g., including a value, such as magnitude, duration, and/or direction of the force input) using a measured displacement of the key cap and a characteristic of the compliant member. The electronic device may include various sensors to measure the displacement of the key cap, including magnetic, optical, capacitive-based sensors, and so on. In some cases, this may allow the electronic device to employ an input structure, such as a keyboard, that may be substantially free of mechanically actuated switch mechanisms.

It will be appreciated that the force sensor, force-sensitive assembly, or the like described herein may be used with various other electronic devices. Without limitation, this may include substantially stationary electronic devices (e.g., including desktop computers, kiosks, terminals, or the like), portable or wearable electronic devices (e.g., including laptops, tablets, watches, glasses, rings, or the like), health monitoring devices, and/or other electronic devices. In this regard, the force sensor described herein may include any appropriate embodiment, configuration, or operation of an input structure. For example, the input structure may be substantially any structure configured to move at least partially based on a characteristic of a compliant or elastic structure connected therewith. This may allow a force sensor to measure a characteristic of a corresponding force input using the movement of the given input structure.

Reference will now be made to the accompanying drawings, which assist in illustrating various features of the present disclosure. The following description is presented for purposes of illustration and description. Furthermore, the description is not intended to limit the inventive aspects to the forms disclosed herein. Consequently, variations and modifications commensurate with the following teachings, and skill and knowledge of the relevant art, are within the scope of the present inventive aspects.

FIG. 1 depicts an electronic device 100 held by a user 104. The electronic device 100 may include or be used with a force sensor, such as the force sensors generally discussed above and described in greater detail below. Electronic device 100 is illustrated as a tablet computing device, but it should be appreciated that any suitable electronic device may be used in or with various embodiments, including a mobile phone, wearable computing device (such as a watch, glasses, jewelry, a band, or the like), a laptop or other portable computer, a display, a touch-sensitive surface, and so on. For purposes of illustration, FIG. 1 depicts the electronic device 100 as including an enclosure 108, a touch-sensitive surface 112, and one or more input/output members 116. It should be noted that the electronic device 100 may also include various other components, such as one or more ports (e.g., a charging port, a data transfer portion, or the like), communications elements, additional input/output members (including buttons, and so on). As such, the discussion of any electronic device, such as electronic device 100, is meant to be illustrative only and not limiting to the particular device discussed or illustrated.

Figure 2:
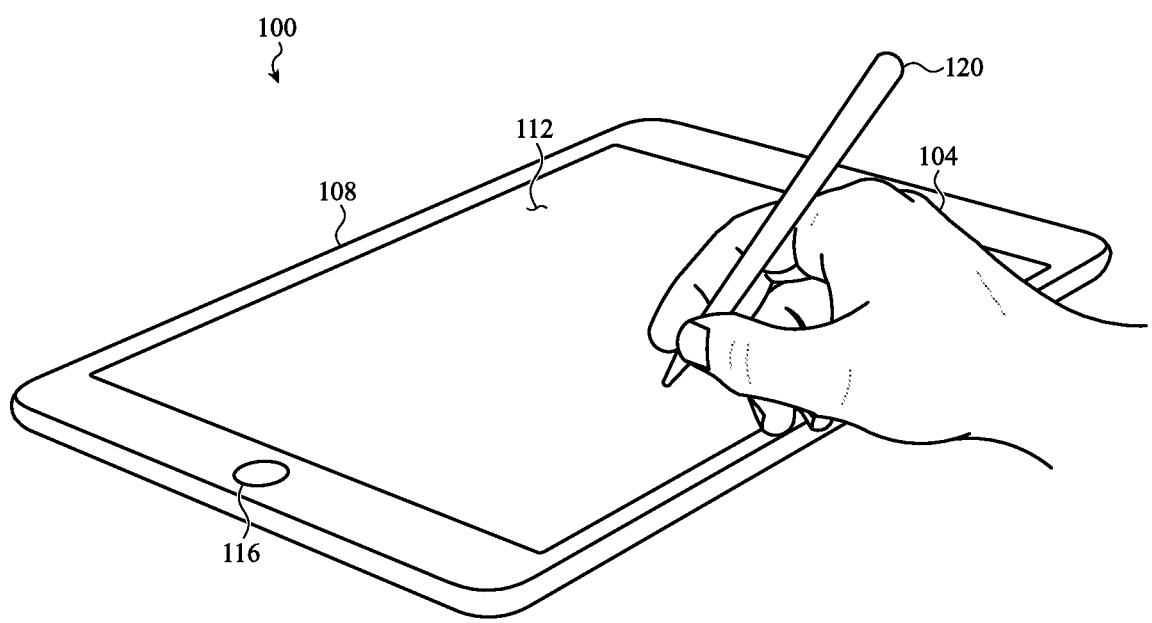
FIG. 2 depicts a stylus contacting an electronic device.

FIG. 2 depicts the electronic device 100 with an input device 120 contacting the touch-sensitive surface 112. The input device 120 may be used to provide input to the electronic device 100, for example, through interaction with the touch-sensitive surface 112. As such, a user may manipulate an orientation and position of the input device 120 relative to the touch-sensitive surface 112 to convey information to the electronic device 100 such as, but not limited to, writing, sketching, scrolling, gaming, selecting user interface elements, moving user interface elements, and so on. The input device 120 may therefore be configured to be grasped or held by a user for manipulation relative to the touch-sensitive surface 112. The touch-sensitive surface 112 may be a multi-touch display screen or a non-display input surface (e.g., such as a trackpad or drawing tablet) as may be appropriate for a given application.

The input device 120 may convey information to the electronic device 100, and the input device 120 may provide an output, at least partially based on the force exerted on the touch-sensitive surface 112. As one example, a width of a line generated on the touch-sensitive surface 112 may be dependent upon a magnitude or relative degree of force exerted by the input device 120 on the touch-sensitive surface 112. In such example, as the user 104 presses the input device 120 into the touch-sensitive surface 112 with greater force, the touch-sensitive surface 112 may depict a wider line. Correspondingly, under a lesser force, the touch-sensitive surface 112 may depict a narrower line. In this regard, as described herein, the input device 120 may include a force sensor that is configured to measure force applied to the input device 120 (e.g., such as that generated by the user 104 pressing the input device 120 against the touch-sensitive surface 112) in order to provide information to the electronic device 100 regarding the applied force.

The input device 120 may also convey information to the electronic device 100, and the input device 120 may provide an output, at least partially based on a direction or orientation of force exerted on the touch-sensitive surface 112 by the input device 120. For example, a width of a line generated on the touch-sensitive surface 112 may be dependent upon the angle at which the user 104 holds the input device 120. As one possibility, as the user 104 raises the input device 120 to a perpendicular orientation with respect to the electronic device 100, the touch sensitive-surface 112 may depict a narrower line. Correspondingly, as the angle of the input device 120 decreases with respect to the electronic device 100, the touch-sensitive surface 112 may depict a thicker line. In this regard, as described herein, the input device 120 may include a force sensor that is configured to measure the orientation or direction of force applied to the input device 120 in order to provide information to the electronic device 100 regarding applied force. It should be appreciated that these are examples of how magnitude and direction/orientation of an applied force may be used to convey information and/or provide an output, and are not intended as limitations.

Figure 3:
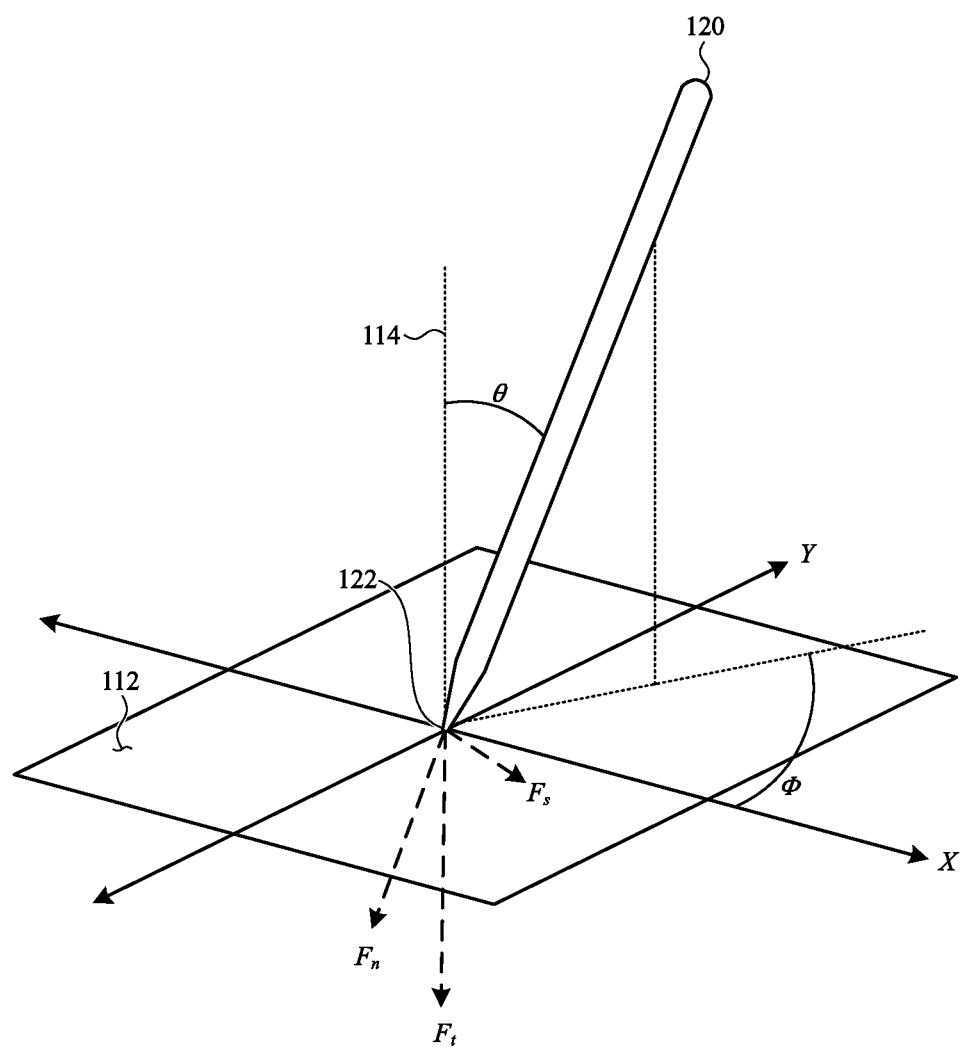
FIG. 3 depicts a stylus contacting a surface of an electronic device and showing force vectors exerted by the stylus on the surface.

FIG. 3 depicts the input device 120 contacting the touch-sensitive surface 112. The input device 120 is shown positioned at an angle θ from an axis 114, which is perpendicular to the touch-sensitive surface 112. In certain embodiments, the input device 120 may detect force (Fn) exerted axially with respect to a tip 122 of the input device 120 (e.g., along vector Fn), parallel to a longitudinal axis of the input device 120. However, as shown in FIG. 3, additional force components (Ft and Fs) may also be exerted on the tip 122. In this regard, the tip 122 may be a contact region of the input device 120 that is used to receive a force input. According to embodiments described herein, the input device 120 may include a force sensor that is configured to measure each of the force components exerted on the input device 120, and/or the overall force Fn. As explained in greater detail below with respect to FIGS. 5A-6B, the force sensor of the input device 120 may measure the respective force components using detected movements of the tip 122 (axial movement, tilt, rotation movement, and so on) and a characteristic of a compliant member coupled with the tip 122 and an internal surface of the input device 120. Further, a rotational angle φ may also be measured using the force sensor described herein. As one example, the three-dimensional force vectors Fn, Ft, and Fs determined by the force sensor may be used to measure the rotational angle φ.

Figure 4:
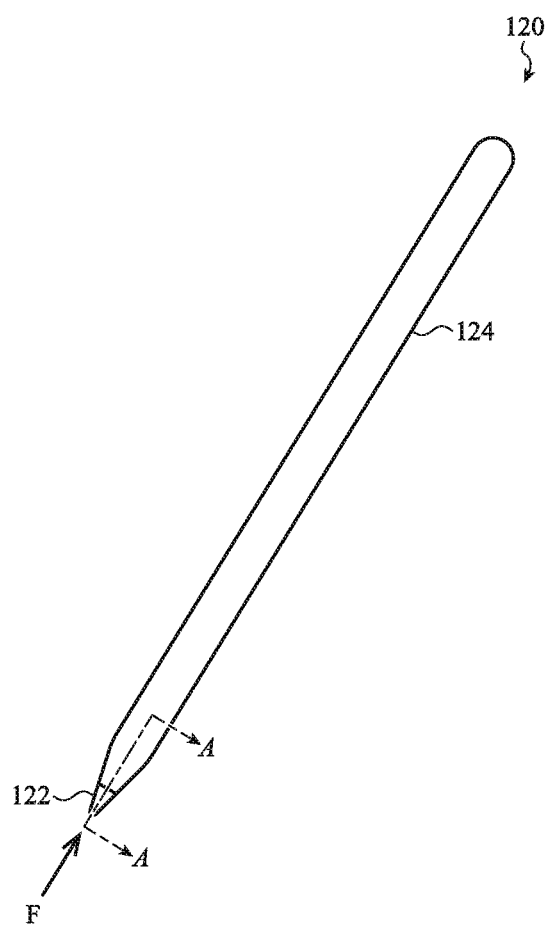
FIG. 4 depicts one embodiment of a sample stylus.

FIG. 4 generally shows the input device 120 having a long, narrow, or elongated body or enclosure 124 coupled to the tip 122 (although the exact shape of the stylus may widely vary). The enclosure 124 may extend along a longitudinal direction defining a stylus body or other structure having an exterior surface that is configured for manipulation by a user as a writing implement. For example, the exterior surface of the enclosure 124 may be a hoop, shell, or other substantially cylindrical structure that may be gripped by a user in order to use the input device 120 as a writing instrument. The tip 122 may be configured to move relative to the enclosure 124 in response to a force input F; such motion is allowed or facilitated by deformation of a compliant member as discussed below in more detail with respect to FIGS. 5A-5B. The force input F may be exerted on the tip 122 in response to the user 104 pressing the input device 120 against the touch-sensitive surface 112, as depicted with respect to FIG. 2.

Figure 5A:
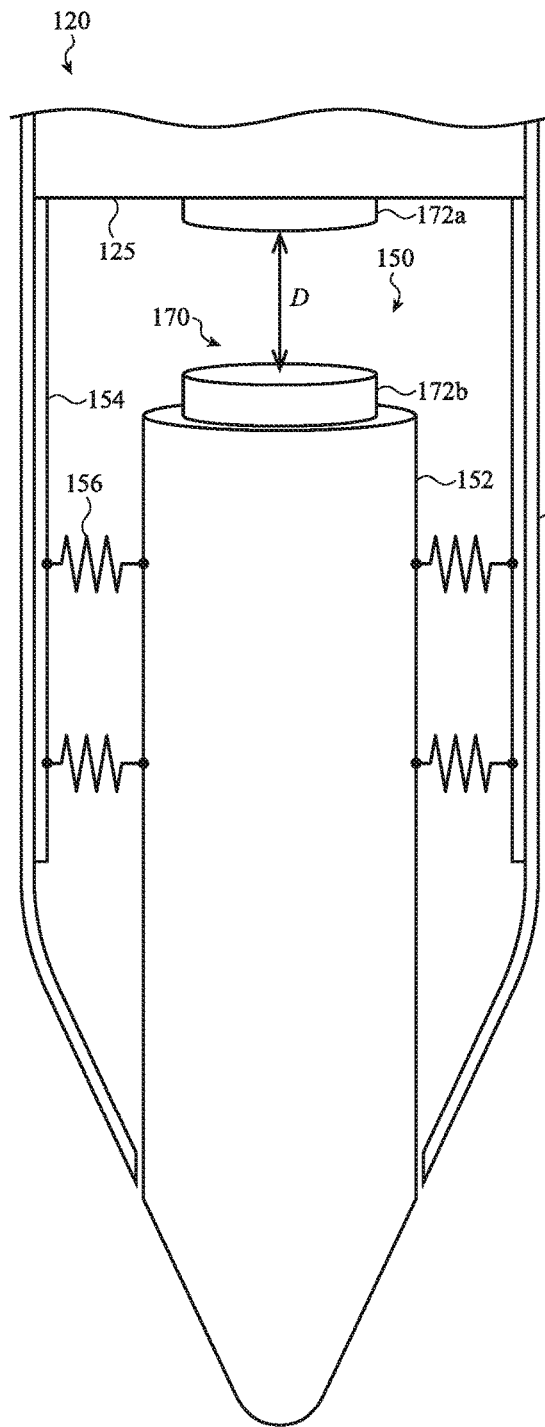
FIG. 5A depicts a simplified cutaway view of the stylus of FIG. 4 in a first position, taken along line A-A of FIG. 4.

FIG. 5A is a simplified cutaway view of the input device 120 of FIG. 4, taken along line A-A of FIG. 4 and through the housing to expose an input structure 152. As shown, the input device 120 includes a force sensor 150 or other force-sensitive assembly configured to measure or estimate a force input. The force sensor 150 may measure a force input received at the tip 122 (not shown in FIG. 5) to provide input to an interconnected electronic device (e.g., electronic device 100 of FIG. 1). In particular, the force sensor 150 may measure force input received at the tip 122 by detecting movements of the input structure 152. The movement may be an axial movement, such as substantially along a longitudinal axis of the enclosure 124. Additionally or alternatively, the movement may be a tilt, in which the input structure 152 moves at least partially off axis from the longitudinal axis. As described in greater detail below, a force required to move the input structure 152 may depend upon characteristics of a compliant member engaged with the input structure 152 within the force sensor 150. This may allow the input structure 152 to move according to a predefined force-displacement curve when impacted by a force input. The force sensor 150 may thus estimate a force exerted on the tip 122 using measured movement of the input structure 152 and the physical characteristics of the compliant member.

In this regard, the force sensor 150 may include the input structure 152. The input structure 152 may be a shaft, driver, mass, beam or other component connected, or integrally formed with, the tip 122. For example, the input structure 152 may be an end portion of the tip 122 that extends into the enclosure 124. The input structure 152 may be a substantially rigid component that moves correspondingly with movement of the tip 122 that results from force received at the tip 122. For example, the input structure 152 may extend out and move relative to the enclosure 124.

The input structure 152 may be positioned within an interior volume of the enclosure 124 and configured to move relative thereto. The force sensor 150 may include a sleeve, shaft, casing, or other structure that defines an opening within the interior volume of the enclosure 124 that is configured to receive the input structure 152, for example, such as housing 154 depicted in FIG. 5A. As such, as shown in FIG. 5A, the input structure 152 may extend through (or partially through) the opening of the housing 154 and away from the enclosure 124. The housing 154 may be coupled with, or an integrally formed component of, the enclosure 124. The housing 154 may be a relatively stationary or fixed component within the interior volume of the enclosure 124. This may control the input structure's 152 movement relative to the housing 154 and/or the enclosure 124.

The force sensor 150 may also include a deformable component coupled to the input structure 152 and the housing 154 and/or enclosure 124. As shown in FIG. 5A, the force sensor 150 may include a compliant member 156 positioned or otherwise interposed between the input structure 152 and the housing 154, thereby defining an annulus between the housing 154 and the compliant member 156. The compliant member 156 may be any structure that elastically deforms (e.g., locally elongates or compresses) in response to an applied force. In this regard, the compliant member 156 may be constructed at least partially from a silicone or silicone-based material; however, in other embodiments, other materials are contemplated.

The compliant member 156 may be connected to the input structure 152 and the housing 154 and/or enclosure 124 such that the compliant member 156 is affixed or otherwise constrained by the input structure 152 and the housing 154 and/or enclosure 124. As such, movement of the input structure 152 resulting from the force received at the tip 122 may cause the compliant member 156 to deform between the input structure 152 and the housing 154 and/or enclosure 124. This may cause the compliant member 156 to allow, impede, resist, or otherwise control movement of the input structure 152 relative to the housing 154 and/or enclosure 124, according to one or more physical characteristics of the compliant member 156. For example, the physical characteristics of the compliant member 156 may define the amount of force required to deform the compliant member 156 over a range of distances. Due in part to the coupling of the compliant member 156 with the input structure 152 and the housing 154, an amount of force required to move the input structure 152 relative to the housing 152 and/or enclosure 124 may be the same as, or correspond or correlate with, the amount of force required to deform the compliant member 156. This may allow the force sensor 150 to measure a displacement of the input structure 152 to determine a force input received by the input device 120. For example, due to the predetermined characteristics of the compliant member 156, the force sensor 150 may estimate a value (e.g., magnitude and/or direction) of a force input that would produce a resulting displacement of the input structure 152.

Figure 5B:
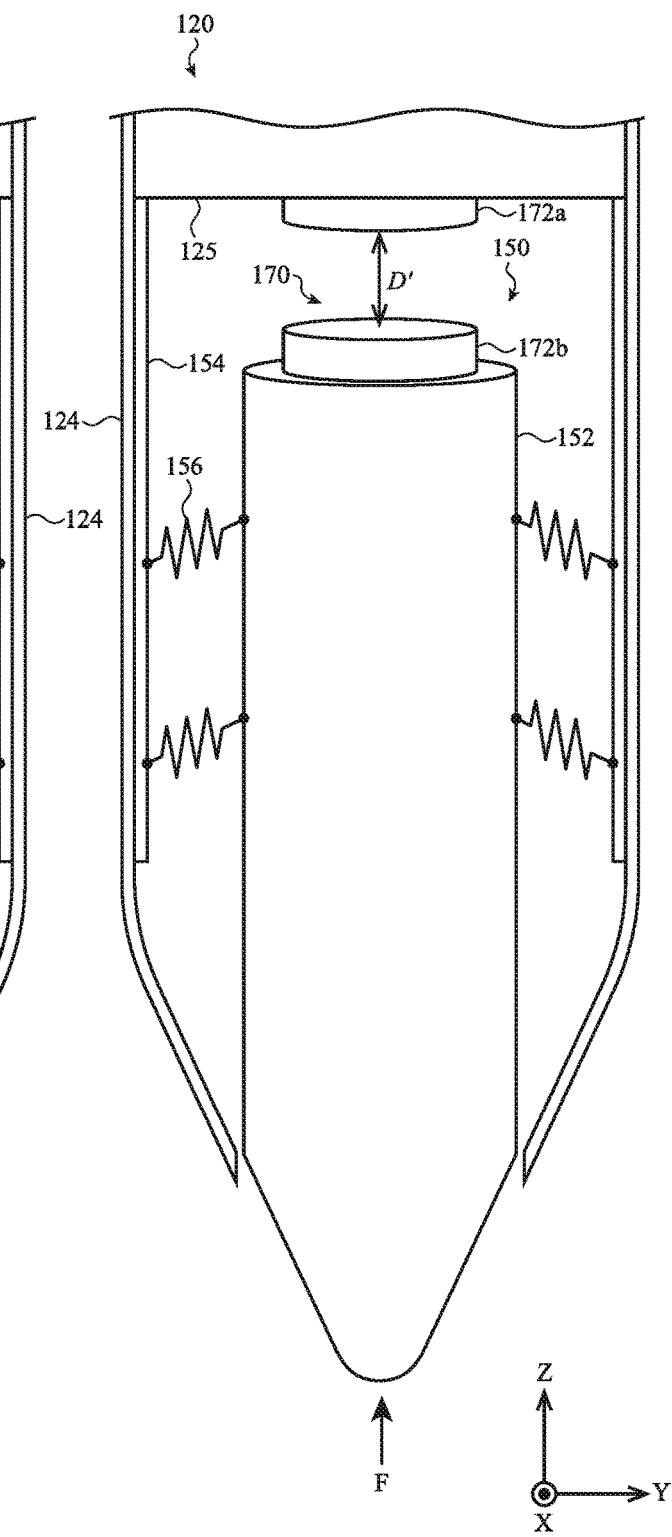
FIG. 5B depicts a simplified cutaway view of the stylus of FIG. 4 in a second position, taken along line A-A of FIG. 4.

To facilitate the foregoing, the force sensor 150 may include, or be coupled with, a sensor 170. As described in greater detail below, the sensor 170 may be any of a variety of sensors that are configured to detect movement or translation of an object, including, but not limited to, magnetic or hall effect sensors, optical sensors, capacitive-based sensors, resistive sensors, or the like. As shown in FIG. 5A, the sensor 170 may include first and second electrodes 172a, 172b (which collectively form the sensor 170) positioned within the interior volume of the enclosure 124 and about the input structure 152. In one embodiment, the first and second electrodes 172a, 172b may be electrodes of a capacitive-based sensor positioned along an interior surface 125 of the enclosure 124 and the input structure 152, respectively. The first and second electrodes 172a, 172b may be communicatively coupled to one another such that, as the input structure 152 moves, a capacitance between the first and second electrodes 172a, 172b may change. This change in capacitance may be indicative of a distance D separating the first and second electrodes 172a, 172b, and therefore may be used to measure axial movement of the input structure 152 relative to the housing 154 and/or enclosure 124. Put another way, as the input structure 152 moves axially in response to an input force F, the distance D shrinks. If the input force F ceases, the distance D returns to its default value. It should be appreciated that the input structure 152 may extend further along or into the enclosure 124 than is illustrated in FIGS. 5A and 5B, in certain embodiments. Thus, the sensor 170 may be located at substantially any point along the shaft of the input device 120.

In turn, a processing unit (not shown in FIG. 5A) integrated with, or coupled to, the force sensor 150 may use the measured movement of the input structure 152 to estimate a force input received along the tip 122. In particular, the processing unit may use information relating to the physical characteristics of the compliant member 156 to correlate or associate the detected movement of the input structure 152 with an expected force input received by the input structure 152. For example, the processing unit may use a value of the distance D measured by the sensor 170 to determine a value or magnitude of deformation of the compliant member 156 (e.g., due to the compliant member 156 being constrained by the input structure 152 and the housing 154 as the input structure 152 moves). In turn, the processing element may estimate a force exerted on the compliant member 156 that resulted in the particular magnitude of deformation of the compliant member 156 (e.g., due to the physical characteristics of the compliant member 156 defining an amount of force required to deform the compliant member 156). The processing element may use the force associated with the deformation of the compliant member 156 to estimate a magnitude or direction of force being exerted on the input structure 152. For example, the compliant member 156 may be one of a set of compliant members and the processing element may use a force associated with the deformation of each of the compliant members to determine a three-dimensional force vector being exerted on the input structure 152.

The input structure 152 is shown in FIG. 5A in a first or neutral position. In this regard, the distance D shown in FIG. 5A may correspond to a distance between the input structure 152 and the interior surface 125 of the enclosure 124 in a state in which no force, or a negligible amount of force, is being exerted on the input structure 152. As such, the compliant member 156 depicted in FIG. 5A may be substantially undeformed.

FIG. 5B is a simplified cutaway view of the input device 120 of FIG. 4, taken along line A-A of FIG. 4 in a fashion similar to FIG. 5A. In FIG. 5B, the input structure 152 is shown in a second or force-loaded position (e.g., a position in which force input F is being exerted on the tip 122, for example, along a z-axis). In the second position, the input structure 152 may be closer to the interior surface 125 than in the first position (e.g., the distance D depicted in FIG. 5A may be greater than a distance D' depicted in FIG. 5B). The movement of the input structure 152 may cause the compliant member 156 depicted in FIG. 5B to be substantially deformed according to a spring characteristic. As described above and depicted in FIG. 5B, the state of deformation of the compliant member 156 may be indicative of a force exerted on the input structure 152. A processing unit coupled with the force sensor 150 may therefore estimate the force exerted on the input structure 152 by measuring the distance D' (which corresponds or otherwise relates to the deformation of the compliant member 156).

The magnitude of the deformation of the compliant member 156 may be at least partially dependent on the physical characteristics (e.g., elasticity, size, shape, or the like) of the compliant member 156. In this regard, the compliant member 156 may be a tunable member that is selectively constructible to achieve a particular relationship between the amount of force required to deform the compliant member 156 over a range of distances and thereby forming the predefined force-displacement curve. The processing unit may therefore be configured to identify the amount of force required to deform the compliant member 156 based on the predetermined physical characteristics of the compliant member 156. This may also allow the force sensor 150 to employ various different compliant members based on a desired feedback or response of the input structure 152 to a force input. For example, a compliant member 156 may be used in the force sensor 150 having a higher or lower degree of elasticity depending on a desired sensitivity of the force sensor.

Figure 6A:
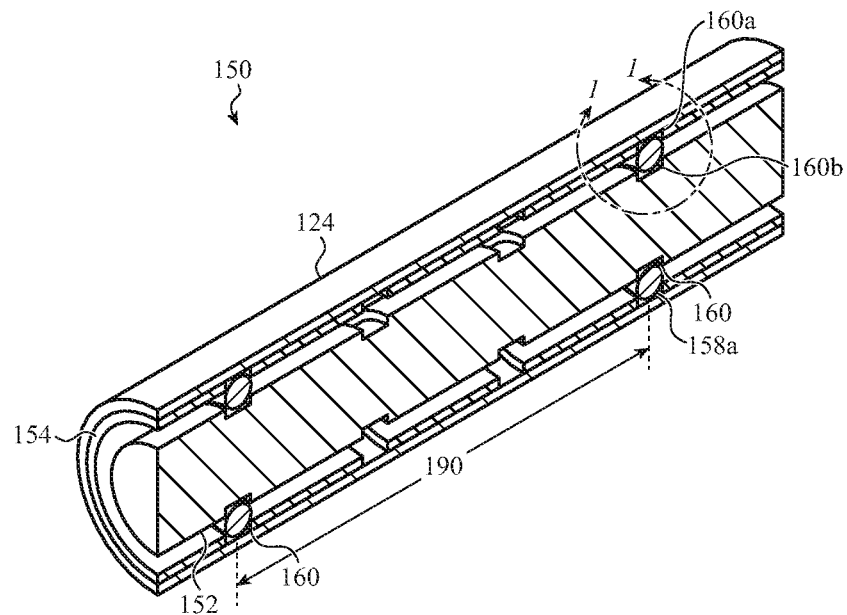
FIG. 6A depicts a cross-sectional view of the stylus of FIG. 4, taken along line A-A of FIG. 4.

FIG. 6A is a cross-sectional view of the input device 120 of FIG. 4, taken along line A-A of FIG. 4. FIG. 6A depicts a sample embodiment of the force sensor 150 described with respect to FIGS. 5A and 5B. As shown, the force sensor 150 includes the input structure 152, the housing 154, and the compliant member 158a.

In the embodiment of FIG. 6A, the compliant member 158a may take the form of one or more O-rings. The O-ring(s) 158a (or other elastic structure) may be positioned around the input structure 152 and may be coupled with each of the input structure 152 and the housing 154. The input structure 152 and the housing 154 include an engagement surface that receives or connects to a portion of the O-ring(s) 158a. This may cause the O-ring(s) 158a to be constrained by the input structure 152 and the housing 154. In particular, the input structure 152 may include an engagement surface that constrains an inner diameter of the O-ring(s) 158a, and the housing 154 may include an engagement surface that constrains an outer diameter of the O-ring(s) 158a. The constraint of the O-ring(s) 158a at the engagement surfaces of the input structure 152 and the housing 154 may cause the O-ring(s) 158a to deform in response to movement of the input structure 152. In turn, the movement of the input structure 152 may be allowed, impeded or otherwise controlled by physical characteristics of the O-ring(s) 158a (e.g., the input structure 152 may move over a range of predefined distances based on the force required to deform the O-ring(s) 158a over a corresponding distance).

In the embodiment of FIG. 6A, the input structure 152 and the housing 154 may include grooves 160. The grooves 160 may be notches, cuts, debossed features, or other structures formed into, or coupled with, surfaces of the input structure 152 and the housing 154. A corresponding pair of the grooves 160 may be configured to receive one of the O-rings 158a. For example, a first groove 160a formed into the surface of the housing 154 may receive a portion of one of the O-rings 158a, and a second groove 160b formed into the surface of the input structure 152 may receive another portion of the O-rings 158a opposite the first groove 160a on the housing 154. Accordingly, the first and second grooves 160a, 160b may be aligned within the opening in order to receive a particular one of the O-rings 158a. Multiple other O-rings 158 may be engaged with other corresponding pairs of grooves 160 in an analogous manner. The receipt by the respective grooves 160 may constrain the O-rings 158a between the input structure 152 and the housing 154 and/or the enclosure 124, as described above.

The constraint of the O-rings 158a between the input structure 152 and the housing 154 may substantially control or set the amount of force required to move the input structure 152. To illustrate, the first and second grooves 160a, 160b may maintain engagement with the O-rings 158a during movement of the input structure 152. For example, the O-rings 158a may be continually received by or coupled with the first and second grooves 160a, 160b during movement of the input structure 152. As such, the O-rings 158a may be deformed between the input structure 152 and the housing 154 and/or the enclosure 124 in response to movement of the input structure 152. Movement of the input structure 152 thus occurs in response to a force sufficient to deform the O-rings 158a.

As shown in FIG. 6A, the O-rings 158a may be spaced apart or separated along the input structure 152 by an offset distance 190. The offset distance 190 may control an axial and/or radial stiffness of the input structure 152. As one possibility, the offset distance 190 may control a magnitude of force required to the input structure 152 longitudinally from a base or concentric position within the opening defined by the housing 154. In the embodiment of FIG. 6A, the offset distance 190 may correspond to a relatively wide separation of the O-rings 158a along the input structure 152. This may correspond to each of the O-rings 158a being positioned on, or proximal to, opposing ends of the housing 154. In other embodiments, other separation distances and configurations are possible and described in greater detail below with respect to FIGS. 7A-7C.

Figure 6B:
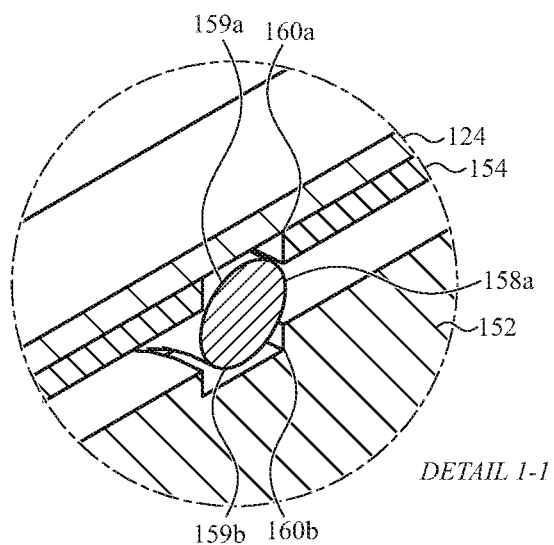
FIG. 6B depicts an enlarged view of the force sensor of FIG. 6A, taken at detail 1-1 of FIG. 6A.

FIG. 6B depicts detail 1-1 of FIG. 6A of the force sensor 150. As shown in the non-limiting example of FIG. 6B, the force sensor 150 is shown in a state in which one of the O-rings 158a is received by the first and second grooves 160a, 160b. The first and second grooves 160a, 160b depicted in FIG. 6B may each receive a portion of one of the O-rings 158a, such as O-ring 158a depicted in FIG. 6B. For example, an outer diameter portion 159a of the O-ring 158a may be received by the first groove 160a formed into the housing 154 and an inner diameter portion 159b of the O-ring 158a may be received by the second groove 160b formed into the input structure 152. As such, the first groove 160a into the housing 154 may constrain the outer diameter portion 159a, while the second groove 160b formed into the input structure 152 may constrain the inner diameter portion 159b. The constraint or engagement of the outer and inner diameter portions 159a, 159b may be maintained while the input structure 152 translates relative to the housing 154. Accordingly, movement of the input structure 152 deforms the O-rings 158 between the first and second grooves 160a, 160b. This, in turn, causes the force required to move the input structure 152 to at least partially depend on the force required to deform the O-rings 158. Put another way, the O-rings control the input structure's movement relative to the enclosure and/or housing and also determine an amount of force required for such movement. It should be appreciated that the force necessary to move the input structure 152 relative to the housing 154 and/or enclosure 124 may vary with a distance moved.

Figure 7A:
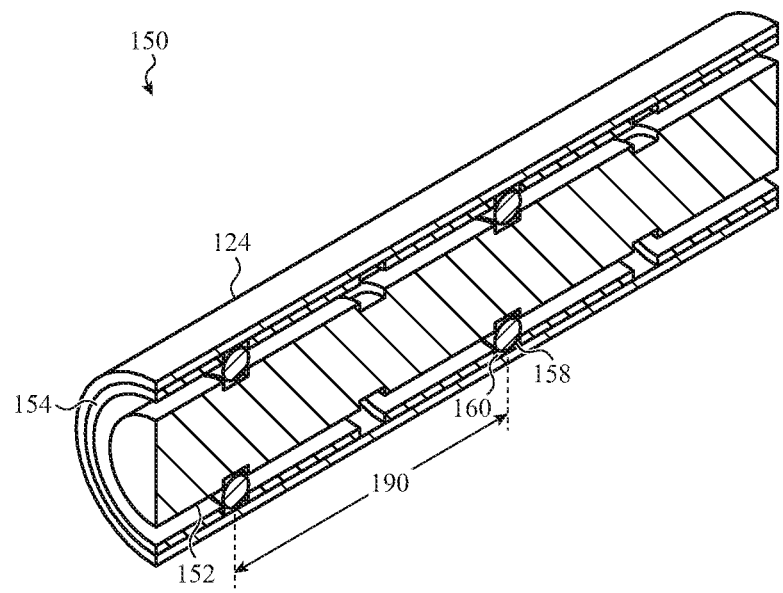
FIG. 7A depicts a cross-sectional view of another embodiment of the stylus of FIG. 4, taken along line A-A of FIG. 4.
Figure 7B:
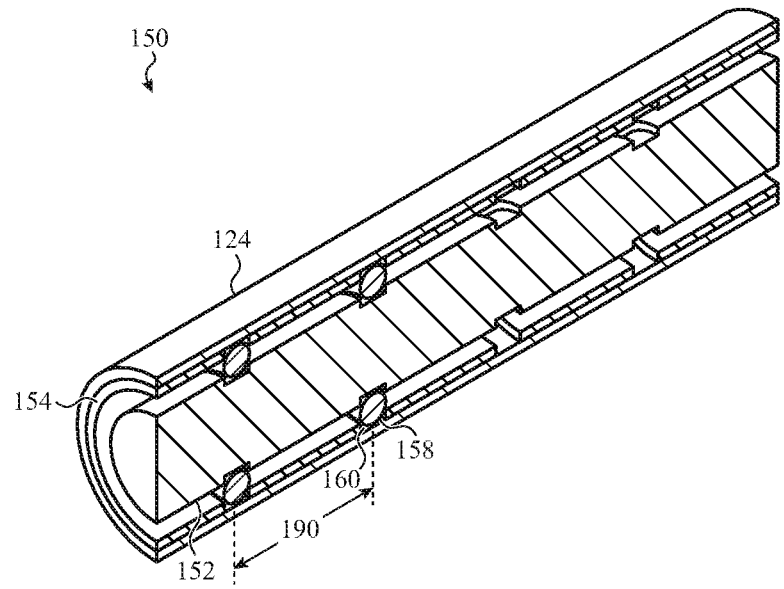
FIG. 7B depicts a cross-sectional view of another embodiment of the stylus of FIG. 4, taken along line A-A of FIG. 4.
Figure 7C:
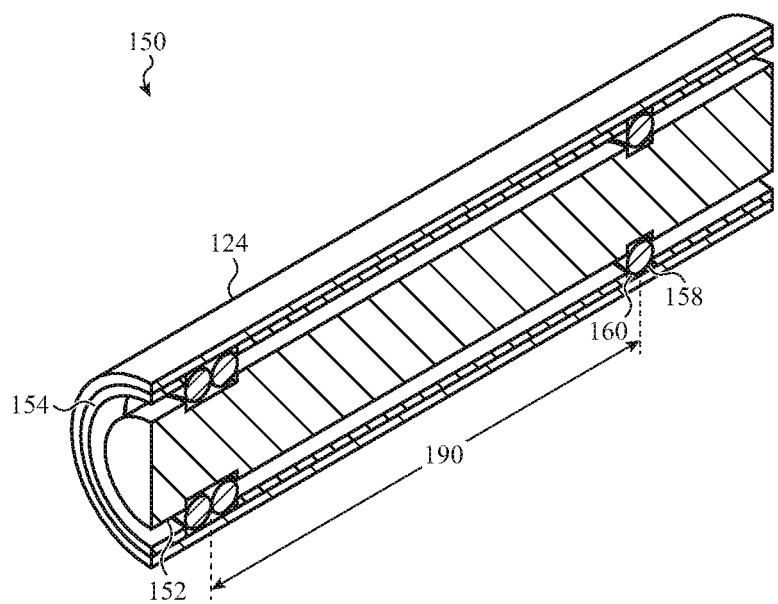
FIG. 7C depicts a cross-sectional view of another embodiment of the stylus of FIG. 4 having offset elastic O-rings, taken along line A-A of FIG. 4.

FIGS. 7A-7C depict cross-sectional views of alternate embodiments of the force sensor 150 of FIGS. 6A and 6B, taken along line A-A of FIG. 4. In particular, FIGS. 7A-7C illustrate cross-sectional views of alternative embodiments of the O-rings 158. For example, the O-rings 158 may be separated by distinct separation distances that may be configured to control an axial and/or radial stiffness of the input structure 152, as shown in FIGS. 7A-7C.

As illustrated in the embodiment of FIG. 7A, the offset distance 190 between the O-rings 158 (or similar elastic structure) may correspond to a relatively moderate separation of the O-rings 158 along the input structure 152. This may result in one of the O-rings 158 being positioned along, or proximal to, a middle region of the housing 154, while another of the O-rings 158 is positioned along, or proximal to, an end region of the housing 154. This may cause the input structure 152 to have an axial and/or radial stiffness that is distinct from the axial and/or radial stiffness of the input structure 152 depicted with respect to FIG. 6A. For example, the input structure 152 depicted in FIG. 7A may have a lesser or greater axial and/or radial stiffness than the mass depicted with respect to FIG. 6A.

As illustrated in the embodiment of FIG. 7B, the offset distance 190 between the O-rings 158 may correspond to a relatively narrow separation of the O-rings 158 along the input structure 152. This may result in two of the O-rings 158 being positioned along, or proximal to, an end region of the housing 154. This may cause the input structure 152 to have an axial and/or radial stiffness that is distinct from the axial and/or radial stiffness of the input structure 152 depicted with respect to FIG. 6A. For example, the input structure 152 depicted in FIG. 7B may have a lesser or greater axial and/or radial stiffness than the input structure 152 depicted with respect to FIG. 6A.

As illustrated in the embodiment of FIG. 7C, the O-rings 158 may include three, four, or more individual O-rings. In the configuration of FIG. 7C, two of the O-rings 158 may be positioned along, or proximal to, an end region of the housing 154, while a third of the O-rings 158 may be positioned along, or proximal to, an end region of the housing 154. This may cause the input structure 152 to have an axial and/or radial stiffness that is distinct from the axial and/or radial stiffness of the input structure 152 depicted with respect to FIG. 6A. For example, the input structure 152 depicted in FIG. 7C may have a lesser or greater axial and/or radial stiffness than the input structure 152 depicted with respect to FIG. 6A.

Additionally or alternatively, the inclusion of additional O-rings in the embodiment of FIGS. 7A-7C may also alter the relationship between the amount of force required to move the input structure 152 over a range of distances. For example, the inclusion of additional O-rings may increase the amount of force required to move the input structure 152 as each additional O-ring may impede movement of the input structure 152. Analogously, the abutment of two or more of the O-rings 158 may also contribute to altering the amount of force required to move the input structure 152. In this manner, the force sensor 150 may include any appropriate amount or configuration of O-rings to control the amount of force required to move the input structure 152 relative to the housing 154 and/or the enclosure 124.

Figure 8A:
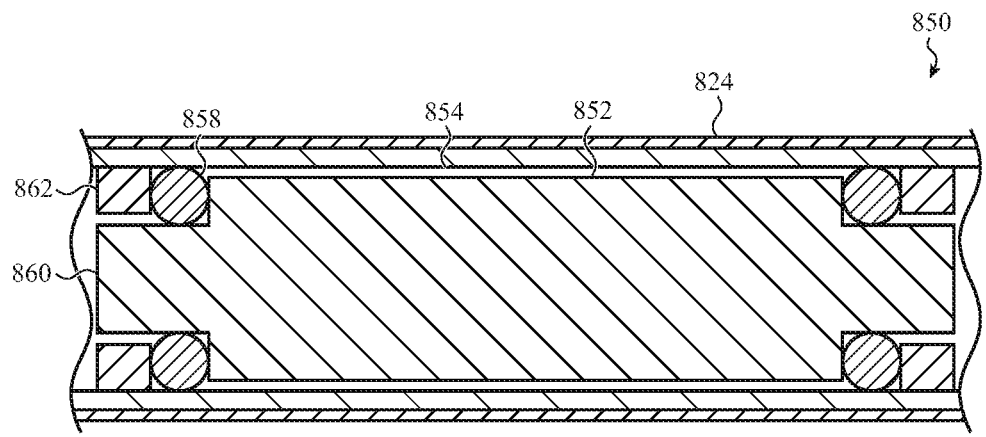
FIG. 8A depicts a cross-sectional view of another embodiment of the stylus of FIG. 4, taken along line A-A of FIG. 4.
Figure 8B:
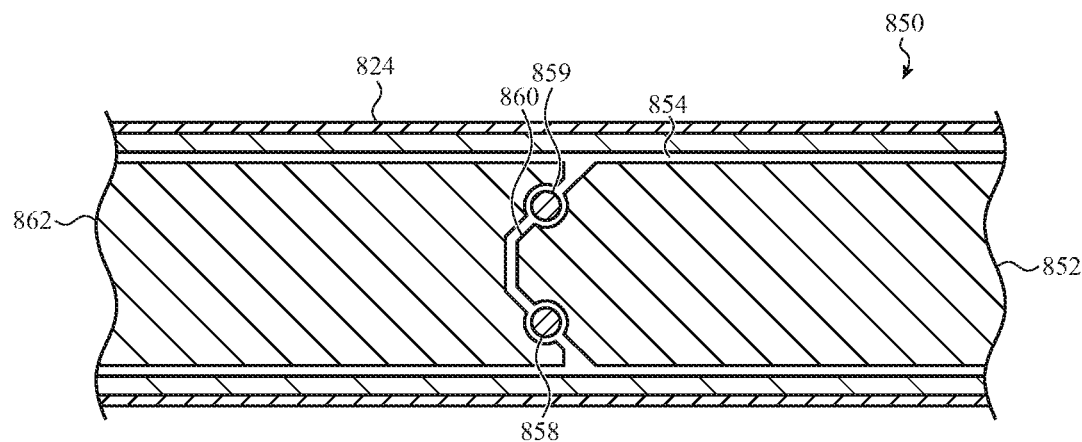
FIG. 8B depicts a cross-sectional view of another embodiment of the stylus of FIG. 4, taken along line A-A of FIG. 4.
Figure 8C:
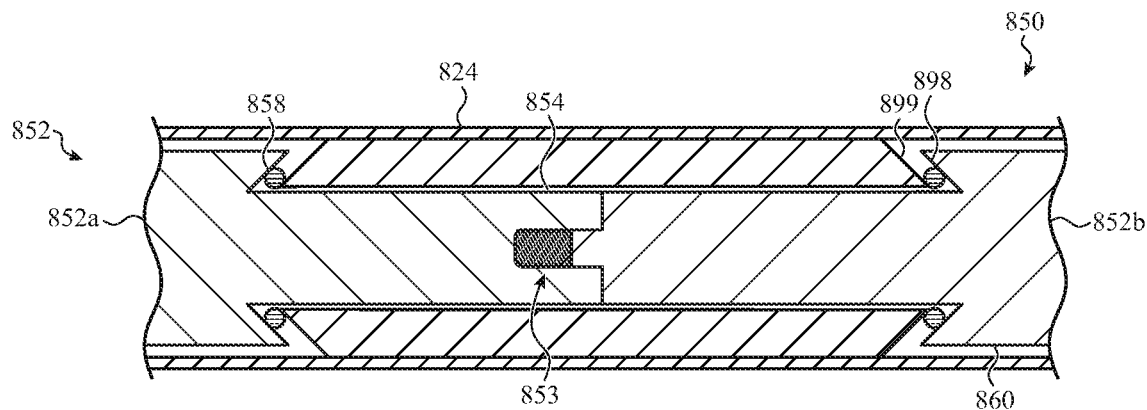
FIG. 8C depicts a cross-sectional view of another embodiment of the stylus of FIG. 4, taken along line A-A of FIG. 4.

FIGS. 8A-8C illustrate various views of components of a force sensor 850 or other force-sensitive assembly, according to one or more embodiments of the present disclosure. The force sensor 850 shown and described with respect to FIGS. 8A and 8B may be substantially analogous to the force sensor 150 described above with respect to FIGS. 1-7C. For example, the force sensor 850 may measure movement of an input structure, mass, driver, or the like in order to estimate a force input received along the input structure. In this regard, analogous to the components described in relation to the embodiments of FIGS. 1-7C, the force sensor 850 may include: input structure 852; housing 854; and O-rings 858. The O-rings 858 may be a deformable structure, compliant member, tuning member, elastic structure, or the like that deforms in response to translation of the input structure 852 relative to the housing 854 and/or enclosure 824.

Notwithstanding the foregoing similarities, the force sensor 850 may include alternative embodiments of engagement surfaces that are configured to couple the O-rings 858 to the input structure 852 and the housing 854. For example, the force sensor 850 may include various features or structures that constrain the O-rings 858 (or other compliant member) between the input structure 852 and the housing 854 and/or enclosure 824, including, but not limited to, collars, brackets, projections, or the like positioned within an interior volume defined by the enclosure 824.

As illustrated in the embodiment of FIG. 8A, the O-rings 858 may be constrained between the input structure 852 and a bracket, projection, or other engagement structure coupled to, or integrally formed with, the housing 854. In particular, the input structure 852 may include end portions 860 that define a reduced thickness region of the input structure 852. The end portions 860 may be formed along opposing ends of the input structure 852. The O-rings 858 may be positioned along the end portions 860. When positioned along the end portions 860, the O-rings 858 may have an outer diameter that is greater than a diameter of input structure 852. This may allow the O-rings 858 to separate the input structure 852 from the housing 854 and/or enclosure 824 when the input structure 852 is positioned within the enclosure 824.

An engagement structure 862 may be coupled with the housing 854 and/or the enclosure 824 within an interior volume defined by the enclosure 824. As shown in FIG. 8A, the engagement structure 862 may be a cylindrical collar, washer, or other structure that is positionable within the internal volume defined by the enclosure 824. In an installed configuration, the engagement structure 862 may encircle the end portions 860 of the input structure 852. This may allow the input structure 852 to be positioned within the housing 854 such that the O-rings 858 abut the engagement structure 862. Accordingly, the O-rings 858 may be constrained by the engagement structure 862 and the end portions 860 of the input structure 852.

As such, analogous to the embodiments described above, a processing element coupled with the force sensor 850 may estimate a force received along the input structure 852 by measuring displacement of the input structure 852. For example, the O-rings 858 may deform in response to movement of the input structure 852; and the force required to deform the O-rings 858 may define or control a force required to move the input structure 852 over a corresponding range of distances. The O-rings 858 may define or control the force required to move the input structure 852 due to the O-rings 858 being constrained by the input structure 852 and the housing 854 and/or the enclosure 824.

As illustrated in the embodiment of FIG. 8B, the O-rings 858 may be constrained between a tapered portion of the input structure 852 and a correspondingly tapered portion of a bracket, projection, or other engagement structure coupled to, or integrally formed with, the housing 854 and/or the enclosure 824. In the embodiment of FIG. 8B, the input structure 852 may have end portions 860 that are tapered or conical. The O-rings 858 may be positioned around the end portions 860.

An engagement structure 862 may be coupled with the housing 854 and/or the enclosure 824 and extend into an interior volume defined by the enclosure 824. For example, the engagement structure 862 may be a pin or lug inserted into the interior volume defined by the enclosure 824. The engagement structure 862 may have a tapered surface that matches a contour of the tapered surface defined by the end portions 860 of the input structure 852. This may allow the tapered surface of the end portions 860 to be received by the tapered surface of the engagement structure 862.

In an installed configuration, the O-rings 858 may be coupled with the end portions 860 and the engagement structure 862. In particular, the O-rings 858 may be engaged with the tapered surface of the end portions 860 while being engaged with the tapered surface of the engagement structure 862. In some cases, one or both of the engagement structure 862 and the end portions 860 may include or define a notch, cut, groove, or the like configured to receive the O-rings 858. As shown in FIG. 8B, notches 859 are formed into both the engagement structure 862 and the end portions 860 to constrain the O-rings 858 between the engagement structure 862 and the end portions 860.

As such, analogous to the embodiments described above, a processing unit coupled with the force sensor 850 may determine a force exerted on the input structure 852 by measuring displacement of the input structure 852. For example, the O-rings 858 may deform in response to movement of the input structure 852; and the force required to deform the O-rings 858 may define or control a force required to move the input structure 852 over a corresponding range of distances. The O-rings 858 may define or control the force required to move the input structure 852 due to the O-rings 858 being constrained by the input structure 852 and the housing 854 and/or the enclosure 824.

As illustrated in the embodiment of FIG. 8C, the O-rings 858 may be constrained between angled or tapered surfaces of the input structure 852 and the housing 854 and/or the enclosure 824. For example, the input structure 852 may include end portions 860 that define an angled surface 898. The O-rings 858 may be positioned around the input structure 852 such that the O-rings 858 contact or otherwise abut the angled surface 898. Correspondingly, the housing 854 may define an angled surface 899 that may match a contour of the angled surface 898. The input structure 852 may be positioned within an interior volume defined by the enclosure 824 such that the O-rings 858 contact or otherwise abut the angled surface 898 and the angled surface 899. Accordingly, one portion of the O-rings 858 may be constrained at the angled surface 898 while another portion of the O-rings 858 may be constrained at the angled surface 899, as the input structure 852 moves relative to the housing 854 and/or the enclosure 824.

The slope, or other geometric characteristics of each of the angled surface 898 and the angled surface 899, may be altered to control an amount of force required to move the input structure 852. Additionally or alternatively, the slope may be altered to adjust the axial stiffness of the input structure 852 relative to the radial stiffness of the input structure 852. As one example, as the slope of one or both of the angled surface 898 and/or the angled surface 899 increases, the axial stiffness of the input structure 852 relative to the radial stiffness of the input structure 852 may increase or decrease.

In some cases, the input structure 852 may be defined by first and second mass portions 852a, 852b. The first and second mass portions 852a, 852b may be joined or coupled to one another via threaded connection 853. For example, the second mass portion 852b may include a threaded fitting that is received by a correspondingly threaded receiving portion of the first mass portion 852a. The first and second mass portions 852a, 852b may be coupled via the threaded connection 853 at a position within an internal volume defined by the enclosure 824. Such assembly and connection may allow the end portions 860 of the input structure 852 to extend beyond, or be larger than, a diameter or other cross-dimension of the internal volume that is defined by the housing 854.

Figure 9A:
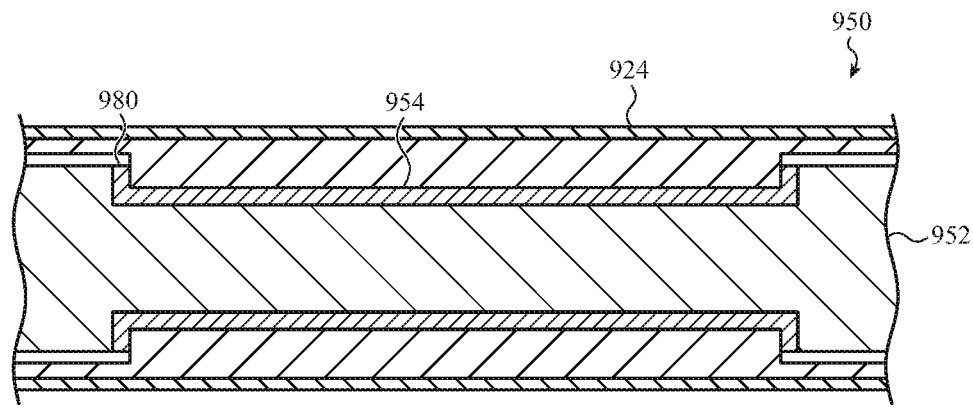
FIG. 9A depicts a cross-sectional view of another embodiment of the stylus of FIG. 4, taken along line A-A of FIG. 4.
Figure 9B:
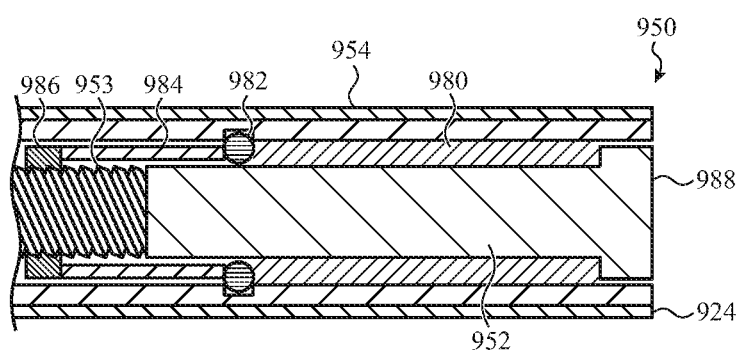
FIG. 9B depicts a cross-sectional view of another embodiment of the stylus of FIG. 4, taken along line A-A of FIG. 4.

FIGS. 9A and 9B illustrate various views of components of a force sensor 950 or other force-sensitive assembly, according to one or more embodiments of the present disclosure. The force sensor 950 shown and described with respect to FIGS. 9A and 9B may be substantially analogous to the force sensor 150 described above with respect to FIGS. 1-7C. For example, the force sensor 950 may measure movement of an input structure in order to estimate a force input exerted on the input structure. In this regard, analogous to the components described in relation to the embodiments of FIGS. 1-7C, the force sensor 950 may include: input structure 952; and housing 954.

Notwithstanding the foregoing similarities, the force sensor 950 may include a molded shell 980. As illustrated in the embodiment of FIG. 9A, the molded shell 980 may be molded or formed between the input structure 952 and the housing 954 and/or the enclosure 924. As such, the molded shell 980 may be an overmolded component of the force sensor 950. The molded shell 980 may be constructed from silicone or other appropriate elastically deformable material; however, in other embodiments, other materials are contemplated. In one embodiment, the molded shell 980 may be formed by injecting a liquid or melted material into an opening or gap between the input structure 952 and the housing 954 and/or the enclosure 924. The liquid or melted material may subsequently cool within the gap and form the molded shell 980. This may cause the molded shell 980 to contact, engage, or otherwise substantially be constrained by surfaces of the input structure 952 and the housing 954 and/or the enclosure 924.

The input structure 952 may be configured to move relative to the housing 954 and/or the enclosure 924 in response to a force input. Analogous to the compliant members 156 described above with respect to FIGS. 5A and 5B, the molded shell 980 may be configured to control the force required to move the input structure 952 over a range of distances, for example, due in part to the molded shell 980 being constrained by the input structure 952 and the housing 954 and/or the enclosure 924. This may allow a processing element coupled with the force sensor 950 to determine a force exerted on the input structure 952 by measuring displacement of the input structure 952. For example, the molded shell 980 may deform in response to movement of the input structure 952; and the force required to deform the molded shell 980 may define or control a force required to move the input structure 952 over a corresponding range of distances.

As illustrated in the embodiment of FIG. 9B, the force sensor 950 may further include O-rings or other elastic structures 982. Substantially analogous to the O-rings 158 described above with respect to FIGS. 6A-7C, the elastic structures 982 may be configured to control the force required to move the input structure 952 over a range of distances, for example, due in part to the elastic structures 982 being constrained by the input structure 952 and the housing 954 and/or the enclosure 924. As shown in FIG. 9B, the elastic structures 982 may be positioned between the input structure 952 and the housing 954 at opposing ends of the molded shell 980. Accordingly, both the elastic structures 982 and the molded shell 980 may operate to control the force required to move the input structure 952, according to the embodiment of FIG. 9B.

In the embodiment of FIG. 9B, the force sensor 950 may include one or more assemblies or structures to bias the elastic structures 982 and/or the molded shell 980 into a state of compression. This may allow the elastic structures 982 and/or the molded shell 980 to be in a state of compression, or pre-loaded, prior to the receipt of a force input by the input structure 952. This may be desirable in order to tune or otherwise modify an amount of force required to move the input structure 952. For example, the amount of force required to move the mass over a range of distances may be different when the elastic structures 982 and/or molded shell 980 are in a compressed versus uncompressed state. Additionally or alternatively, compressing the elastic structures 982 and/or the molded shell 980 may modify an axial and/or radial stiffness of the input structure 952. For example, the compression may increase or decrease the amount of force required to move the input structure 952 from a concentric position within the interior volume defined by the enclosure 924.

To facilitate the foregoing, the input structure 952 may include a threaded portion 953. The threaded portion 953 may be configured to receive a compression nut 986. In one embodiment, a collar 984, or other substantially rigid object, may be placed around the input structure 952 at the threaded portion 953. The compression nut 986 may be adjusted on the threaded portion 953 in order to advance the collar 984 along a longitudinal axis of the input structure 952 (e.g., in a direction toward the elastic structures 982 and/or the molded shell 980). This may cause the elastic structures 982 and/or the molded shell 980 to compress between the collar 984 and an opposing end region 988 of the input structure 952.

It will be appreciated that, in other embodiments, other configurations or orientations of the molded shell 980 and the elastic structures 982 are contemplated and within the scope of the present disclosure. For example, the molded shell 980 and/or the elastic structures 982 may be engaged with, or constrained by, surfaces of the input structure 952, the housing 954, and/or the enclosure 924 having different geometries. Possible geometries include convex, concave, symmetrical, and/or irregular shapes, among other combinations. Additionally or alternatively, the molded shell 980 and the elastic structures 982 need not be constructed from the same elastically deformable material. In some cases, it may be desirable to construct the molded shell 980 and the elastic structures 982 from materials having distinct properties, such as distinct elasticities, as may be appropriate for a given application.

FIGS. 10A-14B illustrate various cutaway views of the input device 120, taken along line A-A of FIG. 4 and through the enclosure 124 to expose a force sensor 1050 or other appropriate force-sensitive assembly, according to one or more embodiments of the present disclosure. The force sensor 1050 shown and described with respect to FIGS. 10A-14B may be substantially analogous to the force sensor 150 described above with respect to FIGS. 1-7C. For example, the force sensor 1050 may measure movement of an input structure in order to determine a force input exerted on the input structure. In this regard, analogous to the components described in relation to the embodiments of FIGS. 1-7C, the force sensor 1050 may include: input structure 1052; housing 1054; and compliant member 1056. The compliant member 1056 is omitted from FIGS. 10A-14B for purposes of clarity; however, it will be appreciated that the compliant member 1056 is positioned between, and constrained by, the input structure 1052 and the housing 1054 and/or the enclosure 124 and is deformable in response to movement of the input structure 1052. In some embodiments, the housing 1054 is part of (e.g., integrally formed with) the enclosure 124 while in others it may be a separate piece, for example positioned within an interior volume defined by the enclosure 124.

Notwithstanding the foregoing, FIGS. 10A-14B present alternate embodiments of a sensor 1070. For example, the sensor 1070 depicted with respect to FIGS. 10A-14B may be configured to measure movement of the input structure 1052 using different sensors, techniques and/or structures, including techniques used to measure axial translation, rotation, and/or off-axis forces exerted on the input structure 1052. It will be appreciated that in some cases multiple different embodiments of the foregoing sensing techniques may be used in any appropriate combination. In this regard, a force sensor of the present invention may include multiple numbers of the sensor 1070 described with respect to FIGS. 10A-14B to measure forces exerted on the input structure 1052. For example, the sensor 1070 may include one or more of, or all of, a capacitive-based sensor, a magnetic sensor, and/or an optical sensor arranged in one or more of the configurations described with respect to FIGS. 10A-14B. As such, any discussion of the sensor 1070 as being a capacitive-based sensor, a magnetic sensor, and/or an optical sensor is for purposes of illustration only.

As illustrated in the embodiment of FIGS. 10A and 10B, the sensor 1070 may be configured to measure axial movement of the input structure 1052 (for example, along a z-axis of the input device 120 in response to an input force F) using first electrode 1072a and second electrode 1072b. The second electrode 1072b may be a single electrode or a set of electrodes. As shown, the first electrode 1072a may be positioned along, or formed with, a surface of the housing 1054 and the second electrode 1072b may be positioned along, or formed with, a surface of the input structure 1052. For example, the second electrode 1072b may be positioned along a side surface of the input structure 1052. In one instance, the first and second electrodes 1072a, 1072b may be electrodes of a capacitive-based motion sensor. As the input structure 1052 moves, a capacitance between the first and at least one of the first or second electrodes 1072a, 1072b may change. This change in capacitance(s) may be indicative of a distance D that the input structure 1052 travels relative to, for example, the housing 1054 and/or the enclosure 124. In other cases, the first and second electrodes 1072a, 1072b may be components of a magnetic or optical sensor that measures movement of the input structure 1052 based on a measured change in a magnetic characteristic or optical pattern, respectively.

By way of illustration, FIG. 10A depicts the input structure 1052 in a first position relative to the housing 1054 and FIG. 10B depicts the input structure 1052 in a second position relative to the housing 1054. In this regard, the sensor 1070 may be configured to measure the motion of the input structure 1052 between the first and second positions. In particular, the sensor 1070 may measure a capacitance between the first and second electrodes 1072a, 1072b as the input structure 1052 moves between the first and second positions depicted in FIGS. 10A and 10B, respectively. The capacitance measured between the first and second electrodes 1072a, 1072b may be different based on the input structure 1052 being in the first or second position. Accordingly, the sensor 1070 may measure the capacitance between the first and second electrodes 1072a, 1072b as being different when the input structure 1052 is in the second position. This capacitance may, in turn, be associated with a distance D' that the input structure 1052 travels relative to, for example, the interior surface 125 of the enclosure.

Figure 11A:
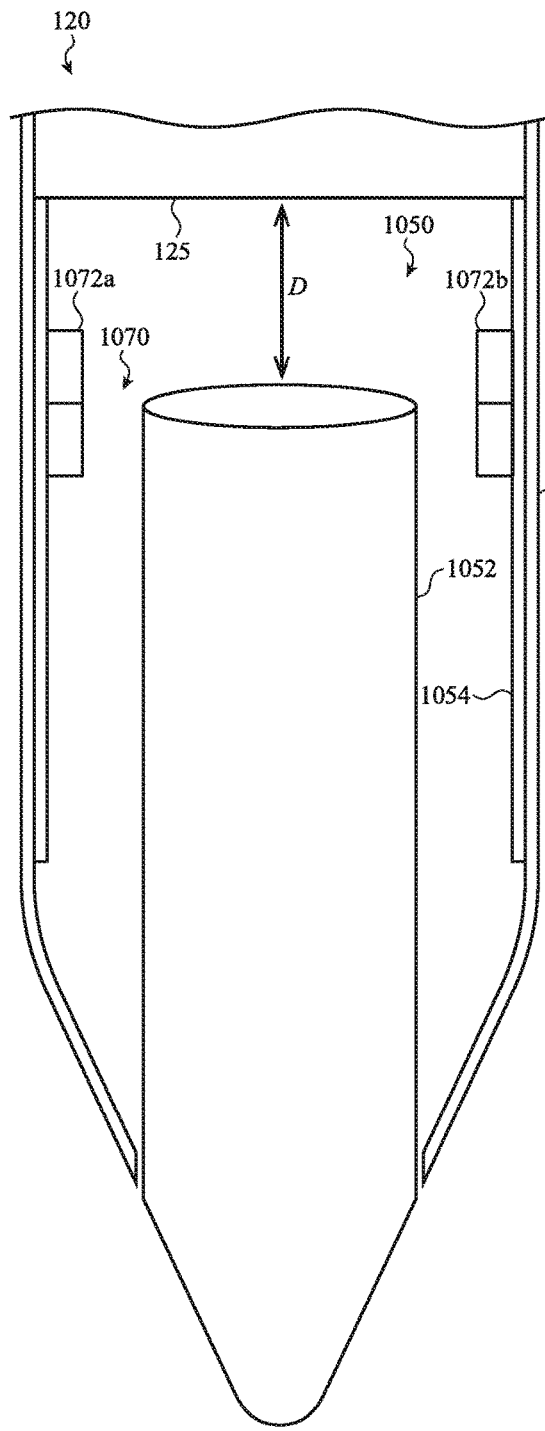
FIG. 11A depicts a simplified cutaway view of another sensor configuration of the stylus of FIG. 4 in a first position, taken along line A-A of FIG. 4.
Figure 11B:
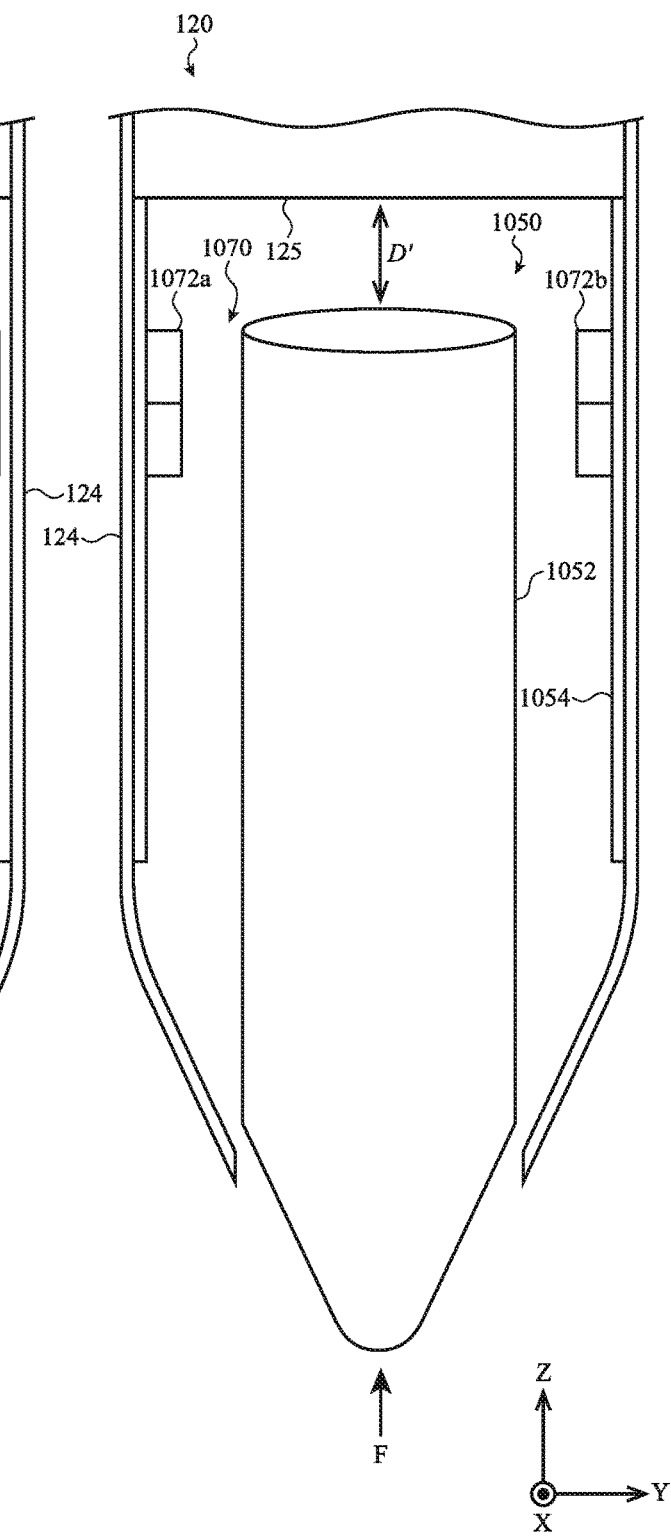
FIG. 11B depicts a simplified cutaway view of the sensor configuration of FIG. 11A in a second position, taken along line A-A of FIG. 4.

As illustrated in the embodiment of FIGS. 11A and 11B, the sensor 1070 may be configured to measure axial movement of the input structure 1052 using first and second electrodes 1072a, 1072b (for example, along a z-axis of the input device 120 in response to an input force F). As shown, the first and second electrodes 1072a, 1072b may be positioned along, or formed with, a surface of the housing 1054. The first and second electrodes 1072a, 1072 may be positioned along the housing 1054 such that the input structure 1052 is positioned between the first and second electrodes 1072a, 1072b. In one instance, the first and second electrodes 1072a, 1072b may be electrodes of a capacitive-based motion sensor. As the input structure 1052 moves, a capacitance between the first and second electrodes 1072a, 1072b may change. For example, the input structure 1052 may alter or disrupt a dielectric characteristic and/or other signal between the first and second electrodes 1072a, 1072b. This disruption may cause a change in capacitance that may be indicative of a distance D that the input structure 1052 travels relative to, for example, the interior surface 125 of the enclosure 124. As in the embodiments of FIGS. 10A and 10B, the first and second electrodes 1072a, 1072b may be replaced by optical sensors, magnetic sensors, and so on.

By way of illustration, FIG. 11A depicts the input structure 1052 in a first position relative to the housing 1054 and FIG. 11B depicts the input structure 1052 in a second position relative to the housing 1054. In this regard, the sensor 1070 may be configured to measure motion of the input structure 1052 between the first and second positions. In particular, the sensor 1070 may measure a capacitance between the first and second electrodes 1072a, 1072b as the input structure 1052 moves between the first and second positions depicted in FIGS. 11A and 11B, respectively. The capacitance measured between the first and second electrodes 1072a, 1072b may be different based on the input structure 1052 being in the first or second position. Accordingly, the sensor 1070 may measure the capacitance between the first and second electrodes 1072a, 1072b as being different when the input structure 1052 is in the second position. This capacitance may, in turn, be associated with a distance D' that the mass travels relative to, for example, the interior surface of the enclosure 124.

As illustrated in the embodiment of FIGS. 12A and 12B, the sensor 1070 may be configured to measure tilt or off-axis forces exerted on the input structure 1052 using the first and second electrodes 1072a, 1072b (for example, along one or more of a z-axis, y-axis, or x-axis of the input device 120 in response to an input force F). As shown, the first and second electrodes 1072a, 1072b may be positioned within the force sensor 1050 in a manner substantially analogous to that depicted in FIGS. 11A and 11B. For example, the first and second electrodes 1072a, 1072b may be positioned along the housing 1054 such that the input structure 1052 is positioned between the first and second electrodes 1072a, 1072b.

In one instance, the first and second electrodes 1072a, 1072b may be electrodes of a capacitive-based motion sensor. As the input structure 1052 moves, a capacitance between the first and second electrodes 1072a, 1072b may change. For example, the input structure 1052 may alter a dielectric characteristic between the first and second electrodes 1072a, 1072b that causes the change in capacitance. This change in capacitance may be indicative of an angular position θ between the input structure 1052 and the housing 1054 and/or the enclosure 124. For example, the input structure 1052 may alter the capacitance measured between the first and second electrodes 1072a, 1072b based on the volume or extent of the input structure 1052 that is positioned between the first and second electrodes 1072a, 1072b. This measurement of the capacitance between the first and second electrodes 1072a, 1072b may be used in conjunction with a measurement of the distance of the input structure 1052 from a reference point on the enclosure 124 (such as the interior surface 125) to estimate the tilt or orientation of the input structure 1052. Stated differently, at a predefined distance from the interior surface 125, the capacitance measured between the electrodes 1072a, 1072b may vary as a function of the angular offset θ. As in the embodiments of FIGS. 10A and 10B, the electrodes 1072a, 1072b may be replaced by optical sensors, magnetic sensors, and so on.

By way of illustration, FIG. 12A depicts the input structure 1052 in a first position relative to the housing 1054 and FIG. 12B depicts the input structure 1052 in a second position relative to the housing 1054. The first position of the input structure 1052 may have an angular position θ that is distinct from an angular position θ' of the second position of the input structure 1052. Each of the first and second positions of the input structure 1052 may be at a known distance D that is separating the input structure 1052 from the enclosure 124. In this regard, the sensor 1070 may be configured to measure motion of the input structure 1052 between the first and second positions. In particular, the sensor 1070 may measure a capacitance between the first and second electrodes 1072a, 1072b as the input structure 1052 moves or tilts between the first and second positions (e.g., movement corresponding to an alteration of a magnitude of the angular position). The capacitance measured between the first and second electrodes 1072a, 1072b may be different based on the input structure 1052 being in the first or second position (e.g., because a different volume or amount of the input structure 1052 is positioned between the first and second electrodes 1072a, 1072b). Accordingly, the sensor 1070 may measure the capacitance between the first and second electrodes 1072a, 1072b as being different when the input structure 1052 is in the second position. This capacitance may, in turn, be associated with the angular offset θ' of the input structure 1052 in the second position.

Figure 13A:
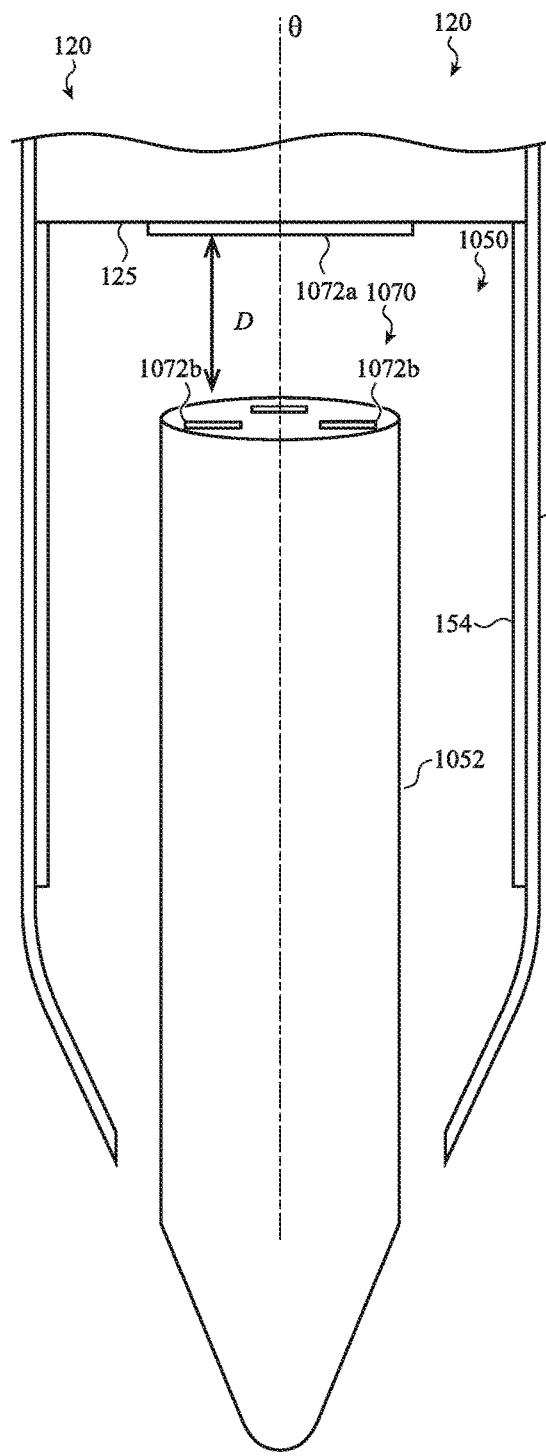
FIG. 13A depicts a simplified cutaway view of another sensor configuration of the stylus of FIG. 4 in a first position, taken along line A-A of FIG. 4.
Figure 13B:
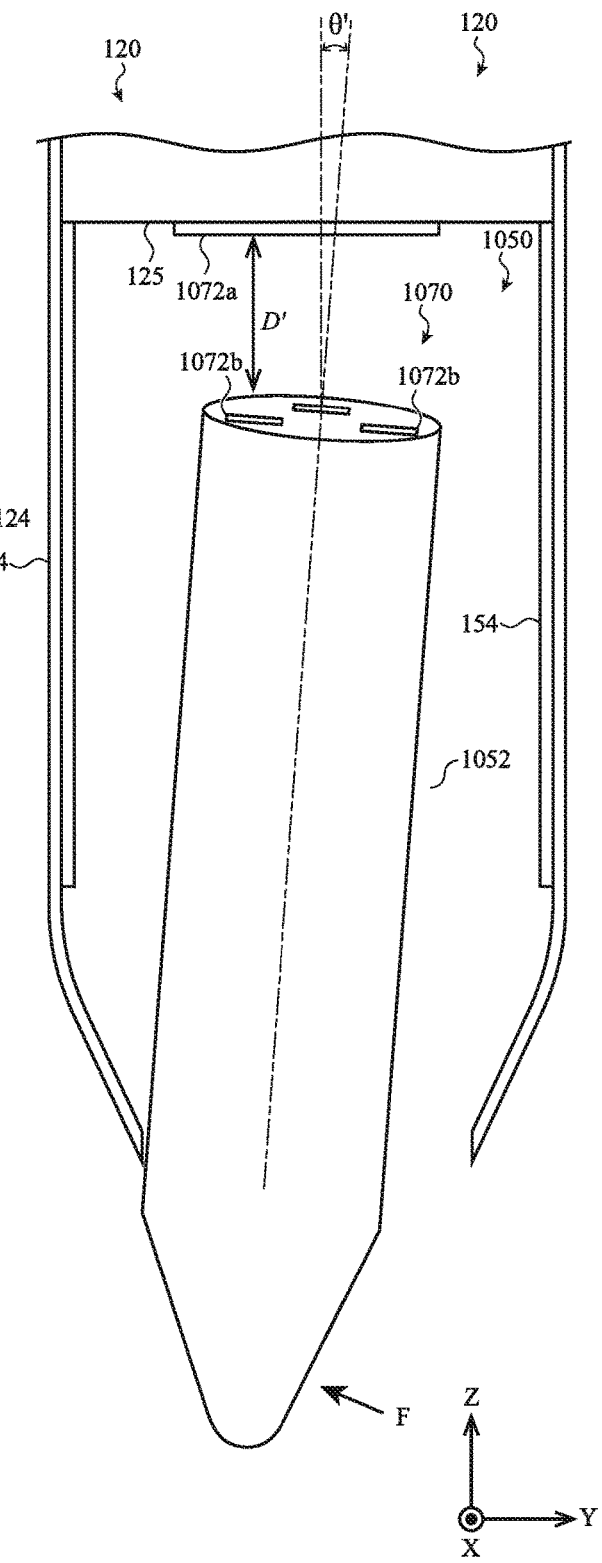
FIG. 13B depicts a simplified cutaway view of the sensor configuration of FIG. 13A in a second position, taken along line A-A of FIG. 4.

In the embodiment of FIGS. 13A and 13B, the sensor 1070 may be configured to measure the tilt or off-axis force received at the input structure 1052 using the measured change in capacitance described above (for example, along one or more of a z-axis, y-axis, or x-axis of the input device 120 in response to an input force F). For example, as illustrated, the second electrode 1072b, may be one of a group of second electrodes 1072b positioned on an end surface of the input structure 1052. Each of the group of second electrodes 1072a may be positioned on a discrete portion of the input structure 1052. The sensor 1070 may be configured to measure the respective change in capacitance between the first electrode 1072a and each of the group of second electrodes 1072b. The respective change in capacitance between the first electrode 1072a and each of the group of second electrodes 1072b may correspond to a distance separating the first electrodes 1072a from each of the respective ones of the group of second electrodes 1072b. These distances may be used by sensor 1070 to determine a three-dimensional orientation of the input structure 1052 (e.g., due to knowing at least the linear distance between the first electrode 1072a and three discrete regions on the input structure 1052). As in the embodiments of FIGS. 10A and 10B, the electrodes 1072a, 1072b may be replaced by optical sensors, magnetic sensors, and so on.

The force sensor 1050 may use the detected three-dimensional orientation of the input structure 1052 (as measured by the sensor 1070) to determine a three-dimensional force vector being exerted on the input structure 1052. For example, the compliant member may deform in three-dimensional space in response to a known or expected three-dimensional force vector. This may be based on the predetermined physical characteristics of the compliant member. As such, analogous to the techniques described above with respect to the force sensor 150 in FIG. 5, the force sensor 1050 may estimate a three-dimensional force vector received at the input structure 1052 that causes the resulting three-dimensional orientation of the input structure 1052 (e.g., based on the known or predefined force-displacement behavior of the compliant member that is constrained between the input structure 1052 and the housing 1054).

By way of illustration, FIG. 13A depicts the input structure 1052 in a first position relative to the housing 1054 and FIG. 13B depicts the input structure 1052 in a second position relative to the housing 1054. A capacitance measured between each of the first electrode 1072a and the group of second electrodes 1072b may be different at the first position of the input structure 1052 (illustrated in FIG. 13A) than at the second position of the input structure 1052 (illustrated in FIG. 13B). This change in orientation may be associated with a change in an angular position of the input structure 1052 within the force sensor 1050, for example, such as a change or alteration of a magnitude of an angular position θ' that is defined between a longitudinal axis of the input structure 1052 and a longitudinal axis of an interior volume defined by the input structure 1052.

Figure 14A:
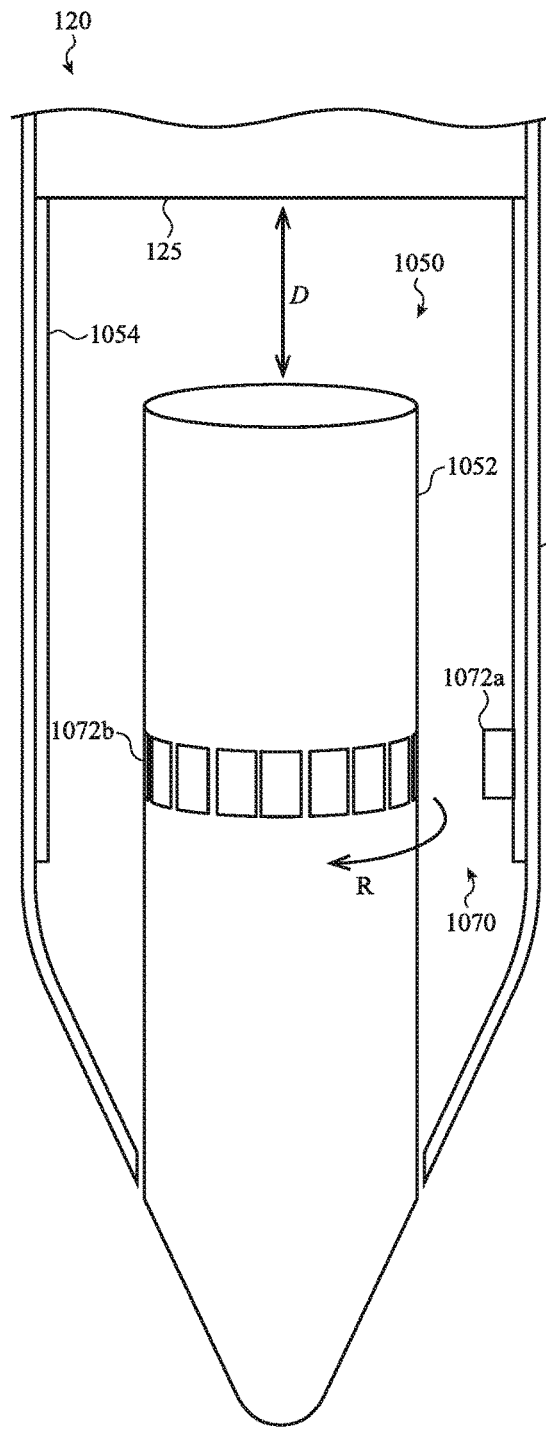
FIG. 14A depicts a simplified cutaway view of another sensor configuration of the stylus of FIG. 4 in a first position, taken along line A-A of FIG. 4.
Figure 14B:
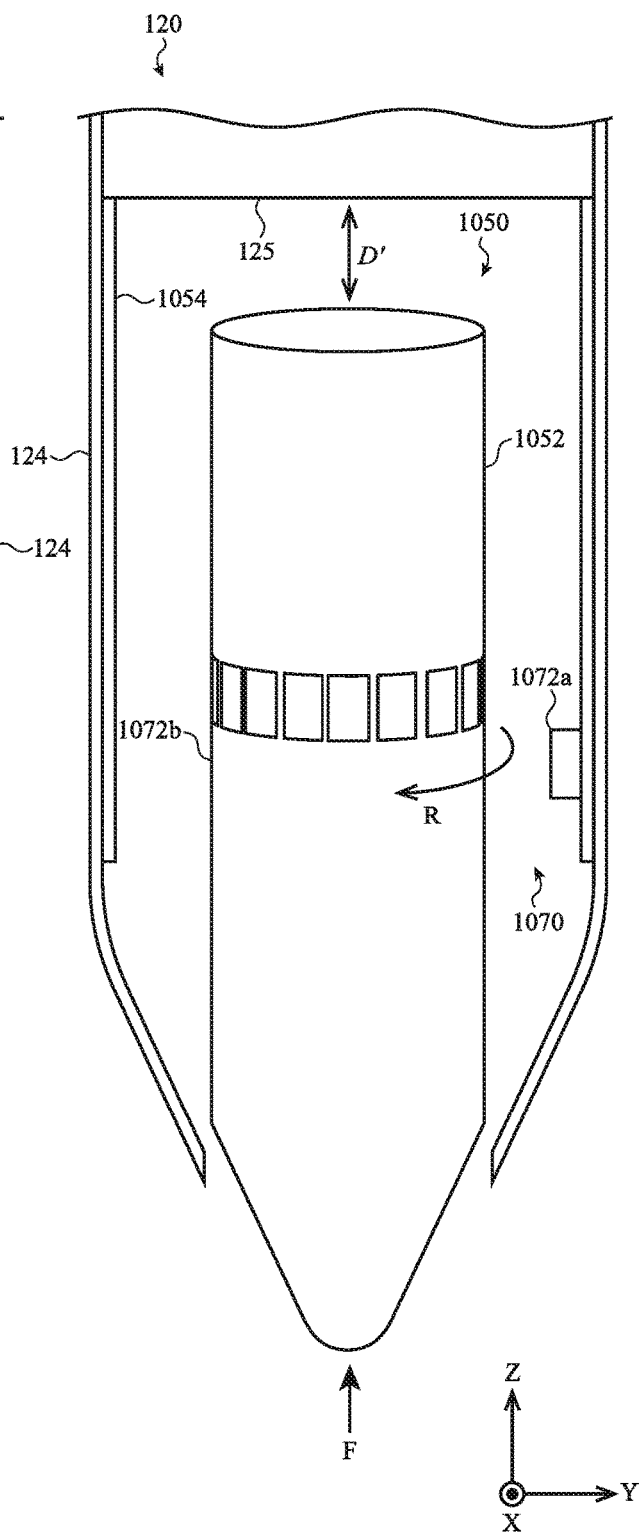
FIG. 14B depicts a simplified cutaway view of the sensor configuration of FIG. 14A in a second position, taken along line A-A of the stylus of FIG. 4.

As illustrated in the embodiment of FIGS. 14A and 14B, the sensor 1070 may be configured to measure rotation of the input structure 1052 using the first and second electrodes 1072a, 1072b. The rotation may be about a longitudinal axis of the input structure 1052 (e.g., such as a z-axis of the input structure 1052). As shown, the first electrode 1072a may be positioned on a portion of the housing 1054 and the second electrode 1072b may be a group of second electrodes 1072b positioned about or on a cylindrical surface of the input structure 1052. Substantially analogous to the first and second electrodes 1072a, 1072b described above with respect to FIGS. 5A and 5B, the first and second electrodes 1072a, 1072b may be electrodes of a capacitive-based sensor. In this regard, the sensor 1070 may detect a change in capacitance between the first electrodes 1072a and each of the group of second electrodes 1072b in order to determine rotational movement R of the input structure 1052 (e.g., about a longitudinal axis). As one possibility, the group of second electrodes 1072b may be spaced apart on the surface of the input structure 1052 such that as the input structure 1052 rotates, a capacitance measured generally between the first electrode 1072a and the group of second electrodes 1072b is momentarily changed or disrupted (e.g., as may occur when a gap or spacing between electrodes of the group of second electrodes 1072b substantially faces the first electrodes 1072a). In turn, the rate at which the capacitance changes may be correlated to the axial movement of the input structure 1052. As in the embodiments of FIGS. 10A and 10B, the first and second electrodes 1072a, 1072b may be replaced by optical sensors, magnetic sensors, and so on.

By way of illustration, FIG. 14A depicts the input structure 1052 in a first rotational position relative to the housing 1054 and FIG. 14B depicts the input structure 1052 in a second rotational position relative to the housing 1054. A capacitance measured between each of the first electrode 1072a and each of the group of second electrodes 1072b may be different at the first position of the input structure 1052 (illustrated in FIG. 14A) than at the second position of the input structure 1052 (illustrated in FIG. 14B). This change or difference in capacitance may, in turn, be associated with the rotational movement R that the input structure 1052 travels relative to the housing 1054. It should be appreciated that some embodiments may permit the enclosure 124 to rotate while the mass is stationary.

Figure 15A:
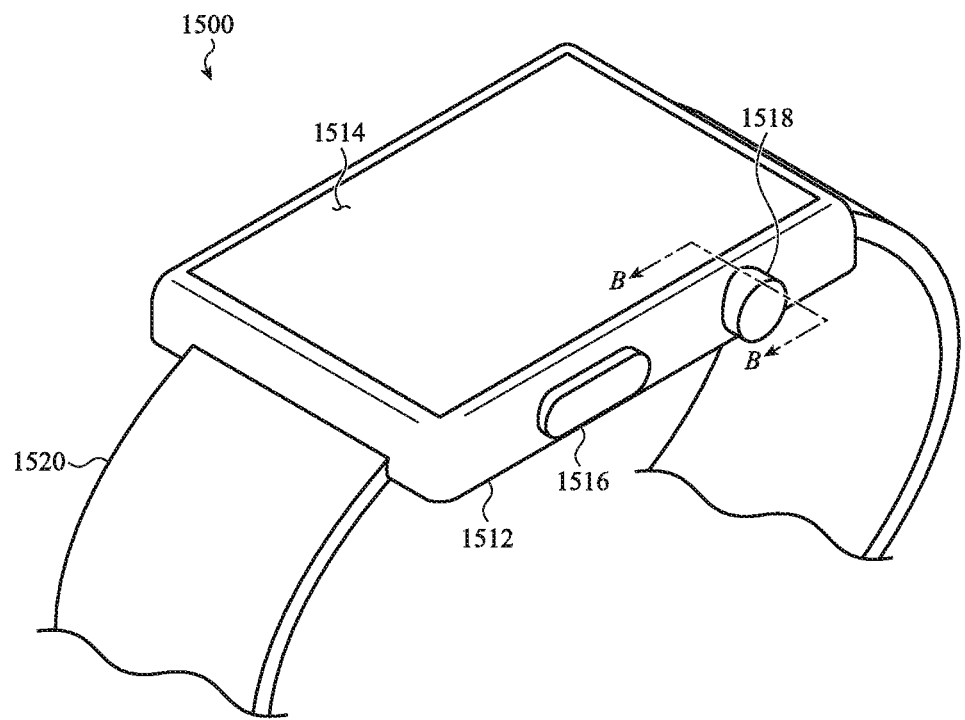
FIG. 15A depicts a sample electronic device having a force sensor.

FIG. 15A depicts an example electronic device 1500. The electronic device 1500 may include a force sensor 1550 (not shown in FIG. 15A), such as the force sensors or force-sensitive assemblies discussed above and described in greater detail below. In this regard, the force sensor 1550 may be substantially analogous to the force sensor 150 described with respect to FIGS. 1-7B. As described with respect to FIGS. 1 and 7B, the force sensor 1550 may be used in a variety of manners within the electronic device 1500. For example, the force sensor 1550 may be configured to detect a force input at a button, crown, and/or other input surface of the electronic device 1500.

As a non-limiting example, as shown in FIG. 15A, the electronic device 1500 may be a wearable electronic device, such as a watch. However, it is understood that electronic device 1500 may be any suitable wearable electronic device that operates with the force sensor 1550. Other examples of other wearable electronic devices may include watches of other configurations, glasses, rings, health monitoring devices (including pedometers, heart rate monitors, or the like), and other electronic devices. For purposes of illustration, FIG. 15A depicts the electronic device 1500 as including an enclosure 1512 (e.g., which may define a watch body); a display 1514; one or more input/output members 1516; a crown 1518; and a band 1520. It should be noted that the electronic device 1500 may also include various other components, such as one or more ports (e.g., charging port, data transfer port, or the like), additional input/output buttons, and so on. As such, the discussion of any electronic device, such as electronic device 1500, is meant as illustrative only.

Figure 15B:
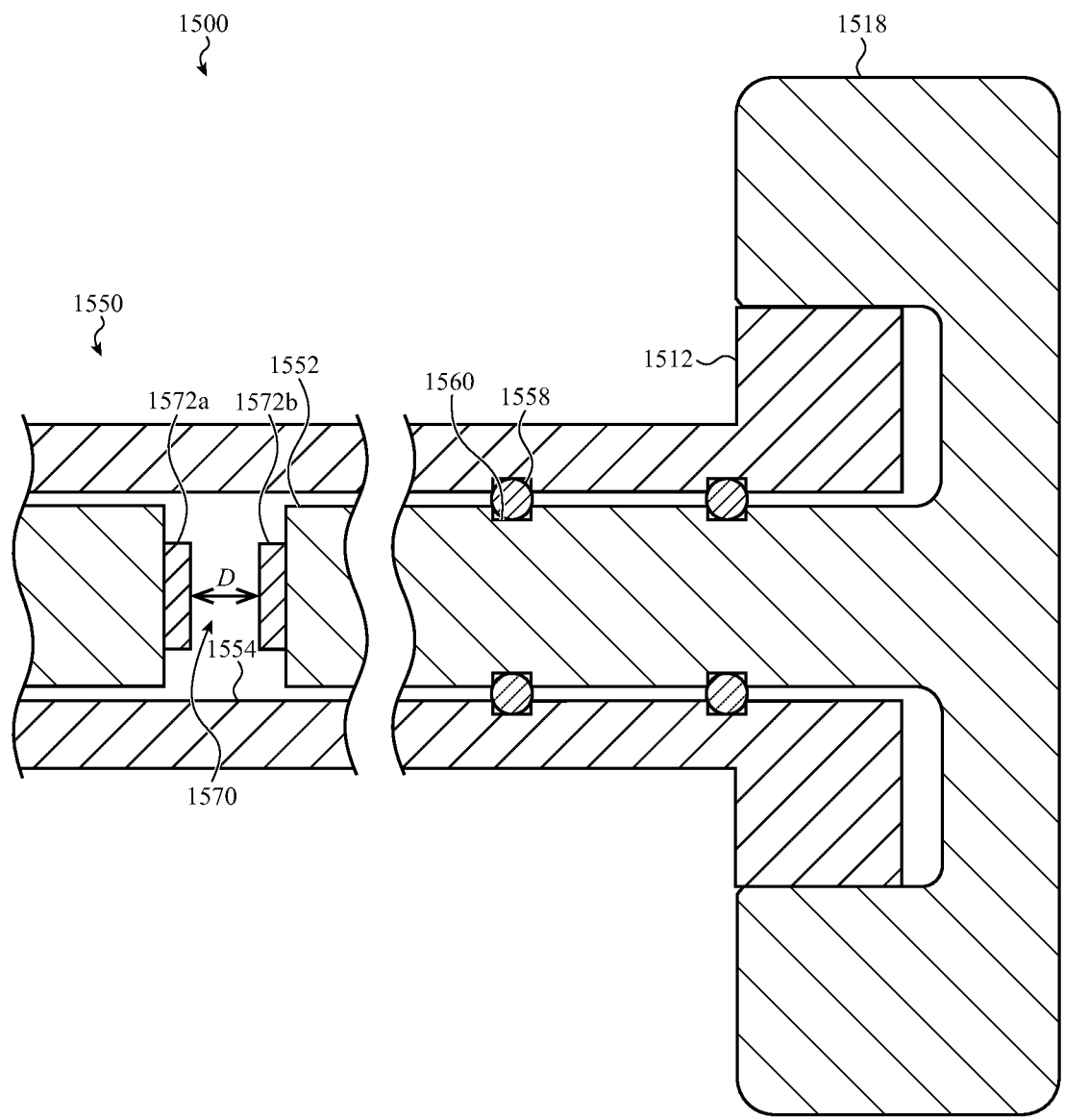
FIG. 15B depicts a cross-sectional view of the electronic device of FIG. 15A, taken along line B-B of FIG. 15A.

FIG. 15B is a cross-sectional view of the electronic device of FIG. 15A, taken along line B-B of FIG. 15A. As illustrated, the electronic device 1500 includes the enclosure 1512, crown 1518, and the force sensor 1550. The force sensor 1550 may be substantially analogous to the force sensor 150 described with respect to FIGS. 1-7C. For example, the force sensor 1550 may measure movement of an input structure in order to estimate a force input exerted on the input structure. In this regard, analogous to the components described in relation to the embodiments of FIGS. 1-7C, the force sensor 1550 may include: input structure 1552; housing 1554; O-rings 1558; grooves 1560; sensor 1570; and first and second electrodes 1572a, 1572b.

Notwithstanding the foregoing similarities, the force sensor 1550 may be integrated with the crown 1518 and/or other input structure of the electronic device 1500. For example, the input structure 1552 may be coupled to, or integrally formed with, the crown 1518. The crown 1518 may be a rotatable and translatable input member of the electronic device 1500. Rotational and translational forces received along the crown 1518 for such input may cause the input structure 1552 to correspondingly rotate and/or move. In this regard, substantially analogous to the force sensor 150 described with respect to FIGS. 1-7C, a processing unit of the electronic device 1500 may determine a force associated with the translational and/or rotational input received at the crown 1518 based on movements of the input structure 1552. For example, the force sensor 1550 may estimate the forces associated with the input exerted on the crown 1518 based on the movements of the input structure 1552 and one or more characteristics of the O-rings 1558 or other compliant member constrained between the input structure 1552 and the housing 1554.

The processing unit of the electronic device 1500 may use the force associated with the rotational and/or translational input to control a function of the electronic device. For example, the display 1514 (depicted in FIG. 15A) may include a graphical output that is responsive in a first manner based on detecting a predetermined magnitude of a force input causing translation movement of the input structure 1552. Further, the graphical output depicted at the display 1514 may be responsive in a second manner based on determining a predetermined magnitude of a force input causing rotational movement of the input structure 1552. In some cases, the processing unit may control a time-keeping function of the electronic device 1500 using the determined force associated with the rotational and/or translational input received at the crown 1518.

Figure 16A:
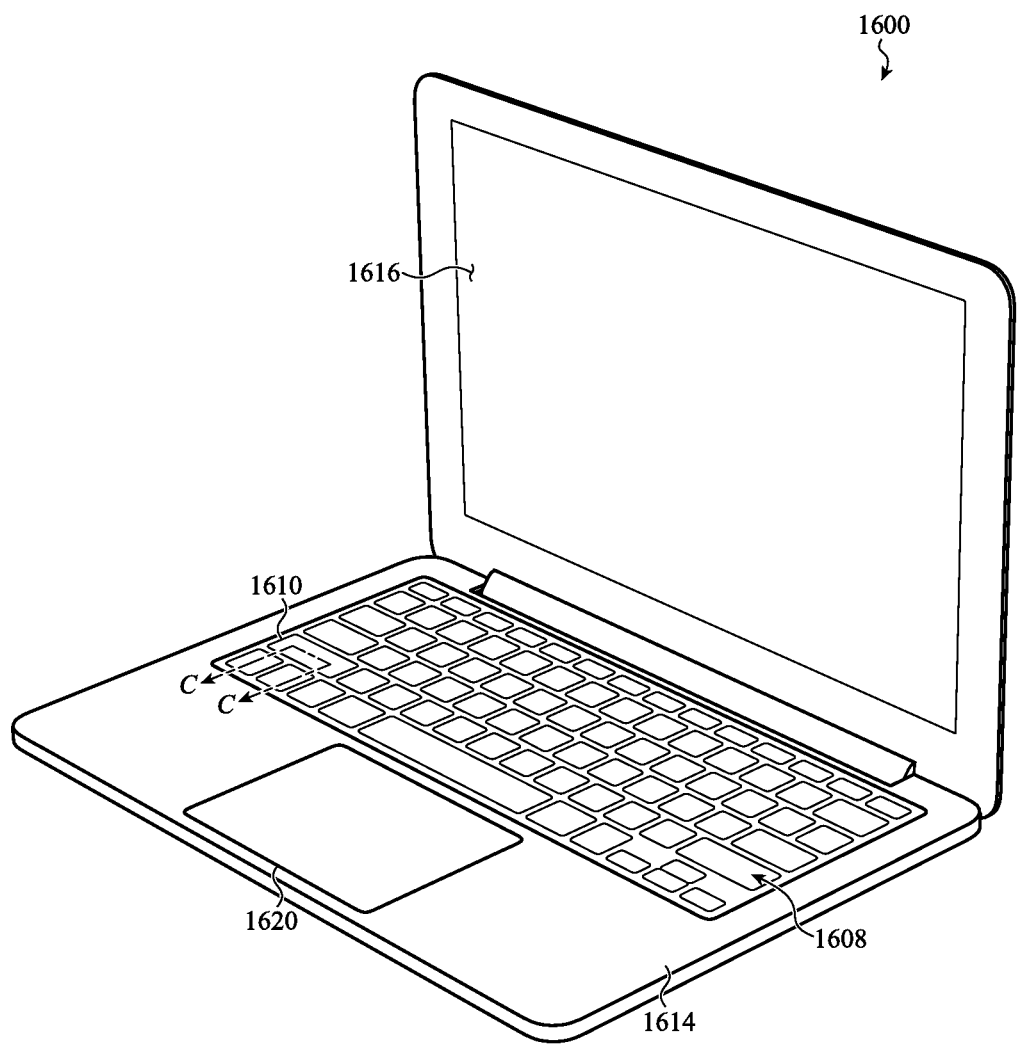
FIG. 16A depicts another sample electronic device having a force sensor.

FIG. 16A depicts an example electronic device 1600 having a keyboard assembly 1608. Each key of the keyboard assembly 1608 may include a "stack up" of layered components that cooperate to trigger a switch event in response to a force input. The keyboard assembly 1608 may include, or be defined by, a force sensor 1650 (not shown in 16A), such as the force sensors, force-sensitive assemblies, or the like discussed above and described in greater detail below. In this regard, the force sensor 1650 may be substantially analogous to the force sensor 150 described with respect to FIGS. 1-7C. As described with respect to FIGS. 1-7C, the force sensor 1650 may be used in a variety of manners within the electronic device 1600. For example, the force sensor 1650 may be configured to detect a force input at an input surface of the electronic device 1600.

As a non-limiting example, as shown in FIG. 16A, the electronic device 1600 may be a laptop computer. However, it is understood that electronic device 1600 may be any suitable device that operates with the keyboard assembly 1608 (or any other suitable device). Other examples of electronic devices may include wearable devices (including watches, glasses, rings, or the like), health monitoring devices (including pedometers, heart rate monitors, or the like), and other electronic devices. For purposes of illustration, FIG. 16A depicts the electronic device 1600 as including the keyboard assembly 1608, an enclosure 1614, a display 1616, and one or more input/output members 1620. It should be noted that the electronic device 1600 may also include various other components, such as one or more ports (e.g., a charging port, a data transfer port, or the like), communications elements, additional input/output members (including buttons), and so on. As such, the discussion of any computing device, such as electronic device 1600, is meant as illustrative only.

The keyboard assembly 1608 may be positioned within the enclosure 1614. In a non-limiting example shown in FIG. 16A, the keyboard assembly 1608 may include a set of key caps 1610. The set of key caps 1610 may partially protrude from the enclosure 1614 and each key cap of the set of key caps 1610 may be substantially surrounded by the enclosure 1614. The set of key caps 1610 may be configured to receive a force input. The force input may depress a particular one of the set of key caps 1610 to trigger one or more switch events that may control the electronic device 1600. As depicted, the keyboard assembly 1608 may be positioned within the electronic device 1600. In an alternative embodiment, the keyboard assembly 1608 may be a distinct, standalone component in electronic communication with the electronic device 1600 via a wireless or hardwired connection.

Figure 16B:
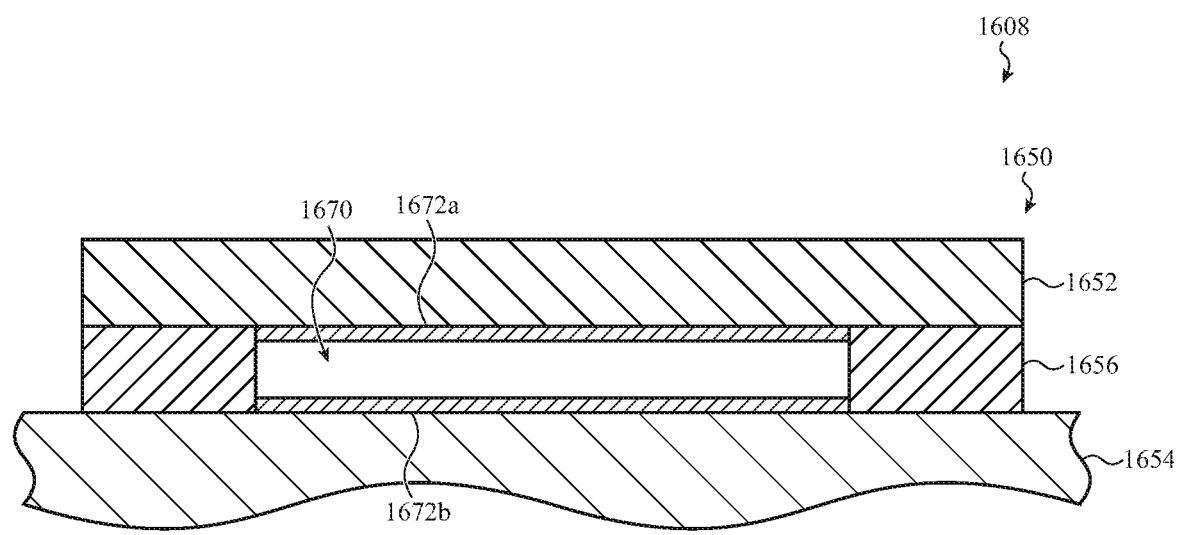
FIG. 16B depicts a cross-sectional view of the electronic device of FIG. 16A, taken along line C-C of FIG. 16A.

FIG. 16B is a simplified cross-sectional view of the electronic device keyboard assembly 1608 of FIG. 16A, taken along C-C of FIG. 16A. As illustrated, the keyboard assembly 1608 may include, or be defined by, the force sensor 1650. The force sensor 1650 may be substantially analogous to the force sensor 150 described with respect to FIGS. 1-7C. For example, the force sensor 1650 may measure movement of an input structure in order to determine a force input exerted on the input structure. In this regard, analogous to the components described in relation to the embodiments of FIGS. 1-7C, the force sensor 1650 may include: input structure 1652; substrate 1654; compliant member 1656; sensor 1670; and first and second electrodes 1672a, 1672b.

Notwithstanding the foregoing similarities, the force sensor 1650 may be integrated within the keyboard assembly 1608 (or other portion of the device's body) to detect force input received along the set of key caps 1610. For example, the input structure 1652 may be coupled to, or integrally formed with, the key cap 1610 depicted in FIG. 16A. The key cap 1610 may be configured to receive a force input in order to control a function of the electronic device 1600. In this regard, substantially analogous to the force sensor 150 described with respect to FIGS. 1-7C, a processing element of the electronic device 1600 may determine a force associated with the input received at the key cap 1610 based on movements of the input structure 1652. For example, the force sensor 1650 may determine the forces associated with the input exerted on the key cap 1610 based on the movements of the input structure 1652 and one or more characteristics of the compliant member 1656 or other elastic structure that is constrained between the input structure 1652 and the substrate 1654. In turn, the processing element of the electronic device 1600 may use the determined force associated with the input at the key cap 1610 to control a function of the electronic device 1600.

Figure 17:
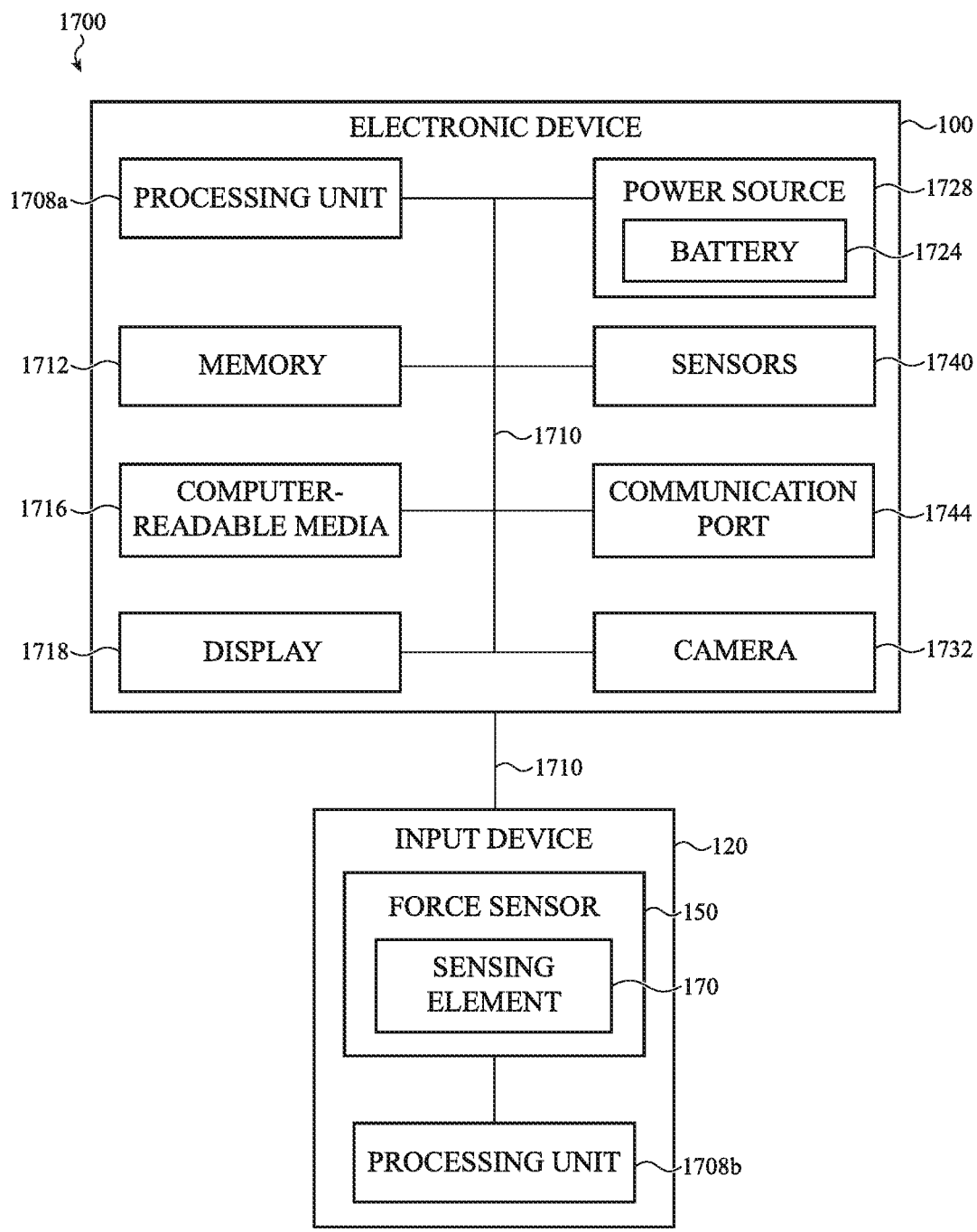
FIG. 17 illustrates a functional block diagram of a system including an input device and an interconnected electronic device.

FIG. 17 presents an illustrative computing system 1700 in which electronic device 100 is interconnected with input device 120. The schematic representation in FIG. 17 may correspond to the electronic device 100 and the input device 120 depicted in FIGS. 1-14B, described above. However, FIG. 17 may also more generally represent other types of devices and configurations that may be used to receive a user input signal from an input device in accordance with the embodiments described herein. In this regard, the computing system 1700 may include any appropriate hardware (e.g., computing devices, data centers, switches), software (e.g., applications, system programs, engines), network components (e.g., communication paths, interfaces, routers) and the like (not necessarily shown in the interest of clarity) for use in facilitating any appropriate operations disclosed herein.

Generally, the input device 120 may be configured to receive a force input along an input structure and generate a corresponding user input signal based on the received input. The user input signal may correspond to a predetermined function executable by the electronic device 100. In this regard, the electronic device 100 and input device 120 may be interconnected via operative link 1704. Operative link 1704 may be configured for electrical power and/or data transfer between the electronic device 100 and the input device 120. In this manner, input device 120 may be configured to control the electronic device 100. For example, the user input signal generated by the input device 120 may be transmitted to the electronic device 100 via operative link 1704. Operative link 1704 may also be used to transfer one or more signals from the electronic device 100 to the input device 120 (e.g., a signal indicative of a magnitude and/or a direction of a force input received along an input structure of the input device 120). In some cases, operative link 1704 may be a wireless connection; in other instances, operative link 1704 may be a hardwired connection.

As shown in FIG. 17, the electronic device 100 may include a processing unit or element 1708a operatively connected to computer memory 1712 and computer-readable media 1716. The processing unit 1708a may be operatively connected to the memory 1712 and computer-readable media 1716 components via an electronic bus or bridge (e.g., such as system bus 1710). The processing unit 1708a may include one or more computer processors or microcontrollers that are configured to perform operations in response to computer-readable instructions. The processing element 1708a may be a central processing unit of the electronic device 100. Additionally or alternatively, the processing unit 1708a may be other processors within the device including application specific integrated chips (ASIC) and other microcontroller devices.

The memory 1712 may include a variety of types of non-transitory computer-readable storage media, including, for example, read access memory (RAM), read-only memory (ROM), erasable programmable memory (e.g., EPROM and EEPROM), or flash memory. The memory 1712 is configured to store computer-readable instructions, sensor values, and other persistent software elements. Computer-readable media 1716 may also include a variety of types of non-transitory computer-readable storage media including, for example, a hard-drive storage device, a solid-state storage device, a portable magnetic storage device, or other similar device. The computer-readable media 1716 may also be configured to store computer-readable instructions, sensor values, and other persistent software elements.

In this example, the processing unit 1708a is operable to read computer-readable instructions stored on the memory 1712 and/or computer-readable media 1716. The computer-readable instructions may adapt the processing unit 1708a to perform the operations or functions described above with respect to FIGS. 2-16B. The computer-readable instructions may be provided as a computer-program product, software application, or the like. It should be appreciated that the processing unit 1708a may be located in an electronic device associated with the stylus, rather than the stylus itself. In such embodiments, data may be transmitted from the stylus to and from the electronic device, such that the processing unit in the electronic device may operatively control the stylus.

As shown in FIG. 17, the electronic device 100 may also include a display 1718. The display 1718 may include a liquid-crystal display (LCD), organic light emitting diode (OLED) display, light emitting diode (LED) display, or the like. If the display 1718 is an LCD, the display may also include a backlight component that can be controlled to provide variable levels of display brightness. If the display 1718 is an OLED or LED type display, the brightness of the display 1718 may be controlled by modifying the electrical signals that are provided to display elements.

The electronic device 100 may also include a battery 1724 that is configured to provide electrical power to the components of the electronic device 100. The battery 1724 may include one or more power storage cells that are linked together to provide an internal supply of electrical power. In this regard, the battery 1724 may be a component of a power source 1728 (e.g., including a charging system or other circuitry that supplies electrical power to components of the electronic device 100). The battery 1724 may be operatively coupled to power management circuitry that is configured to provide appropriate voltage and power levels for individual components or groups of components within the electronic device 100. The battery 1724, via power management circuitry, may be configured to receive power from an external source, such as an AC power outlet or interconnected computing device. The battery 1724 may store received power so that the electronic device 100 may operate without connection to an external power source for an extended period of time, which may range from several hours to several days.

The electronic device 100 may also include one or more sensors 1740 that may be used to detect a touch and/or force input, environmental condition, orientation, position, or some other aspect of the electronic device 100. Example sensors 1740 that may be included in the electronic device 100 may include, without limitation, one or more accelerometers, gyrometers, inclinometers, goniometers, or magnetometers. The sensors 1740 may also include one or more proximity sensors, such as a magnetic hall-effect sensor, inductive sensor, capacitive sensor, continuity sensor, or the like.

The sensors 1740 may also be broadly defined to include wireless positioning devices including, without limitation, global positioning system (GPS) circuitry, Wi-Fi circuitry, cellular communication circuitry, and the like. The electronic device 100 may also include one or more optical sensors including, without limitation, photodetectors, photosensors, image sensors, infrared sensors, or the like. In one example, the sensor 1740 may be an image sensor that detects a degree to which an ambient image matches a stored image. As such, the sensor 1740 may be used to identify a user of the electronic device 100. The sensors 1740 may also include one or more acoustic elements, such as a microphone used alone or in combination with a speaker element. The sensors 1740 may also include a temperature sensor, barometer, pressure sensor, altimeter, moisture sensor or other similar environmental sensor. The sensors 1740 may also include a light sensor that detects an ambient light condition of the electronic device 100.

The sensor 1740, either alone or in combination, may generally be a motion sensor that is configured to determine an orientation, position, and/or movement of the electronic device 100. For example, the sensor 1740 may include one or more motion sensors including, for example, one or more accelerometers, gyrometers, magnetometers, optical sensors, or the like to detect motion. The sensors 1740 may also be configured to determine one or more environmental conditions, such as temperature, air pressure, humidity, and so on. The sensors 1740, either alone or in combination with other input, may be configured to estimate a property of a supporting surface including, without limitation, a material property, surface property, friction property, or the like.

The electronic device 100 may also include a camera 1732 that is configured to capture a digital image or other optical data. The camera 1732 may include a charge-coupled device, complementary metal oxide (CMOS) device, or other device configured to convert light into electrical signals. The camera 1732 may also include one or more light sources, such as a strobe, flash, or other light-emitting device. As discussed above, the camera 1732 may be generally categorized as a sensor for detecting optical conditions and/or objects in the proximity of the electronic device 100. However, the camera 1732 may also be used to create photorealistic images that may be stored in an electronic format, such as JPG, GIF, TIFF, PNG, raw image file, or other similar file types.

The electronic device 100 may also include a communication port 1744 that is configured to transmit and/or receive signals or electrical communication from an external or separate device. The communication port 1744 may be configured to couple to an external device via a cable, adaptor, or other type of electrical connector. In some embodiments, the communication port 1744 may be used to couple the electronic device 100 with a computing device and/or other appropriate accessories configured to send and/or receive electrical signals. The communication port 1744 may be configured to receive identifying information from an external accessory, which may be used to determine a mounting or support configuration. For example, the communication port 1744 may be used to determine that the electronic device 100 is coupled to a mounting accessory, such as a particular type of stand or support structure.

As described above with respect to FIGS. 1-7C, the input device 120 may generally employ various components and systems to facilitate receiving a force input and generating a corresponding user input signal. As shown, and with reference to FIGS. 1-7C, the input device 120 may include the force sensor 150 and the sensor 170. The input device 120 may also include a processing unit 1708b. The processing unit 1708b may be coupled with the force sensor 150 and configured in a manner substantially analogous to that of the processing unit 1708a of the electronic device 100. For example, the processing unit 1708a may include one or more computer processors or microcontrollers that are configured to perform operations in response to computer-readable instructions. The processing unit 1708b may also be used to generate a user input signal in response to a force input detected by the force sensor 150.

As described above, the input device 120 may be configured to estimate a magnitude or direction of a force input received along an input structure. For example, the input structure may be constrained within an opening or interior volume by a compliant member. The compliant member may be coupled along the input structure such that the compliant member operates to control movements of the input structure. The sensor 170 may detect movements of the input structure. One or both of the processing units 1708a, 1708b may estimate a force input received at the input structure using the detected motion or displacement of the input structure and a characteristic of the compliant member, as described herein. In some cases, the processing unit 1708 may use the estimated force input to generate a user input signal used to control a function of the electronic device 100.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An input device, comprising:
an enclosure defining an interior volume; and
a force sensor at least partially positioned within the interior volume and comprising:
  a housing coupled to the enclosure, wherein the housing defines a first groove;
  an input structure extending through the housing and out of the enclosure, the input structure configured to receive a force input, wherein the input structure defines a second groove aligned with the first groove;
  a compliant member coupled to and extending radially between an inner surface of the housing and an outer surface of the input structure, the compliant member being elastically moveable in response to movement of the input structure relative to the housing, wherein the compliant member is constrained within the housing by the first groove and the second groove; and
  a sensor positioned within the housing and configured to detect a value of a displacement of the input structure caused by the force input.

2. The input device of claim 1, wherein:
the enclosure is a stylus body;
the input structure is a shaft extending along a longitudinal axis of the stylus body;
the displacement is one or both of an axial movement or tilt of the input structure relative to the housing;
the compliant member is an O-ring encircling the shaft within the housing and having a spring characteristic that controls deformation of the O-ring;
the sensor comprises an electrode positioned at an end of the shaft, within the housing, and is configured to output a signal corresponding to the value of the displacement; and
the input device further comprises a processing unit configured to determine a value of the force input using both the spring characteristic and the signal.

3. The input device of claim 2, wherein:
the force input results from contact between a tip of the shaft and another electronic device; and
the input structure is configured to depict a graphical output that is responsive to the value of the force input as determined by the processing unit.

4. The input device of claim 1, wherein:
the compliant member is a first compliant member contacting the housing and the input structure; and
the force sensor further comprises a second compliant member contacting the housing and the input structure.

5. The input device of claim 4, wherein:
the first compliant member is separated from the second compliant member by an offset distance; and
the offset distance at least partially determines at least one of a radial stiffness or an axial stiffness of the input structure.

6. The input device of claim 1, wherein:
the compliant member impedes the displacement of the input structure according to a spring characteristic; and
the input device is configured to transmit a signal to another electronic device, the signal derived from the value of the displacement and the spring characteristic of the compliant member.

7. The input device of claim 6, wherein the spring characteristic varies based on at least one of:
a width of the compliant member;
a shape of the compliant member;
a material of the compliant member; or
a position of the compliant member relative to the input structure.

8. An input device, comprising:
a force sensor, comprising:
  a housing, wherein the housing defines a first groove and a second groove;
  an input structure at least partially surrounded by the housing and configured to receive a force input, wherein the input structure defines:
    a third groove aligned with the first groove; and
    a fourth groove aligned with the second groove;
  a first compliant member encircling the input structure within the housing, the first compliant member being coupled to a radially inner surface of the housing and a radially outer surface of the input structure, wherein the first compliant member is constrained within the housing by the first groove and the third groove;
  a second compliant member encircling the input structure within the housing, the second compliant member being coupled to the radially inner surface of the housing and the radially outer surface of the input structure, the second compliant member being axially displaced from the first compliant member, wherein the first compliant member and the second compliant member are configured to deform in response to the force input, thereby controlling a movement of the input structure relative to the housing, wherein the second compliant member is constrained within the housing by the second groove and the fourth groove; and
  a sensor configured to detect the movement of the input structure; and
a processing unit configured to determine a value of the force input from the movement of the input structure.

9. The input device of claim 8, wherein:
the input structure is configured to tilt within the housing;
the sensor is configured to detect the tilt; and
the processing unit is further configured to determine a direction of the force input using the tilt.

10. The input device of claim 8, wherein:
the sensor comprises a pair of electrodes, the pair of electrodes positioned within the housing and separated from one another;
the movement of the input structure changes a capacitance between the pair of electrodes; and
the sensor is configured to generate an output based on a change in the capacitance.

11. The input device of claim 10, wherein a first electrode of the pair of electrodes is positioned on the input structure, such that the first electrode moves with the input structure relative to a second electrode of the pair of electrodes.

12. The input device of claim 11, wherein:
the input structure is a shaft having a longitudinal axis;
the input structure rotates about the longitudinal axis; and
the first electrode is a trackable element positioned on the shaft.

13. The input device of claim 10, wherein:
the pair of electrodes are positioned on opposite sides of the housing; and
the input structure is positioned at least partially between the pair of electrodes.

14. The input device of claim 8, further comprising an enclosure; wherein
the force sensor is at least partially within the enclosure; and
the force sensor is attached to the enclosure.

15. An input device, comprising:
an enclosure defining an exterior surface;
an input structure at least partially extending into the enclosure and configured to move axially along a longitudinal axis of the input device and tilt relative to the longitudinal axis in response to a force input;
a compliant member connected to the input structure and configured to deform in response to the force input; and
a sensor configured to detect both movement along the longitudinal axis and tilt of the input structure relative to the longitudinal axis, wherein:
the input device is configured to transmit a signal to another electronic device that is derived from a value of at least one of the movement along the longitudinal axis or the tilt and an estimated deformation of the compliant member.

16. The input device of claim 15, wherein the signal indicates at least one of a value or a direction of the force input.

17. The input device of claim 15, wherein:
the input device further comprises a housing positioned within the enclosure and at least partially surrounding the compliant member and the input structure; and
the compliant member is constrained by the housing.

18. The input device of claim 17, wherein the compliant member is an overmolded component positioned in an annulus between the housing and the input structure.

19. The input device of claim 15, wherein:
the exterior surface is substantially cylindrical and surrounded by both the input structure and the compliant member; and
the exterior surface is configured to be grasped by a user.

* * * * *